United States Patent [19]
Van Doren et al.

[11] Patent Number: 6,085,294
[45] Date of Patent: Jul. 4, 2000

[54] DISTRIBUTED DATA DEPENDENCY STALL MECHANISM

[75] Inventors: Stephen Van Doren, Northborough; Rahul Razdan, Princeton, both of Mass.

[73] Assignee: Compaq Computer Corporation, Houston, Tex.

[21] Appl. No.: 08/957,129

[22] Filed: Oct. 24, 1997

[51] Int. Cl.[7] .................................................. G06F 12/08
[52] U.S. Cl. ........................... 711/144; 711/143; 711/121; 711/148; 710/39; 710/40
[58] Field of Search ................................... 711/120, 121, 711/148, 143, 144, 145, 146; 710/39, 40

[56] References Cited

U.S. PATENT DOCUMENTS

| | | | |
|---|---|---|---|
| 5,325,510 | 6/1994 | Frazier | 711/118 |
| 5,404,483 | 4/1995 | Stamm et al. | |
| 5,522,058 | 5/1996 | Iwasa et al. | 711/145 |
| 5,530,933 | 6/1996 | Frink et al. | 711/141 |
| 5,881,253 | 3/1999 | Seeman | 710/128 |

*Primary Examiner*—Hiep T. Nguyen
*Attorney, Agent, or Firm*—Hamilton, Brook, Smith & Reynolds, P.C.

[57] ABSTRACT

A method and apparatus for preventing system wide data dependent stalls is provided. Requests that reach the top of a probe queue and which target data that is not contained in an attached cache memory subsystem, are stalled until the data is filled into the appropriate location in cache memory. Only the associated central processor unit's probe queue is stalled and not the entire system. Accordingly, the present invention allows a system to chain together two or more concurrent operations for the same data block without adversely affecting system performance.

27 Claims, 18 Drawing Sheets

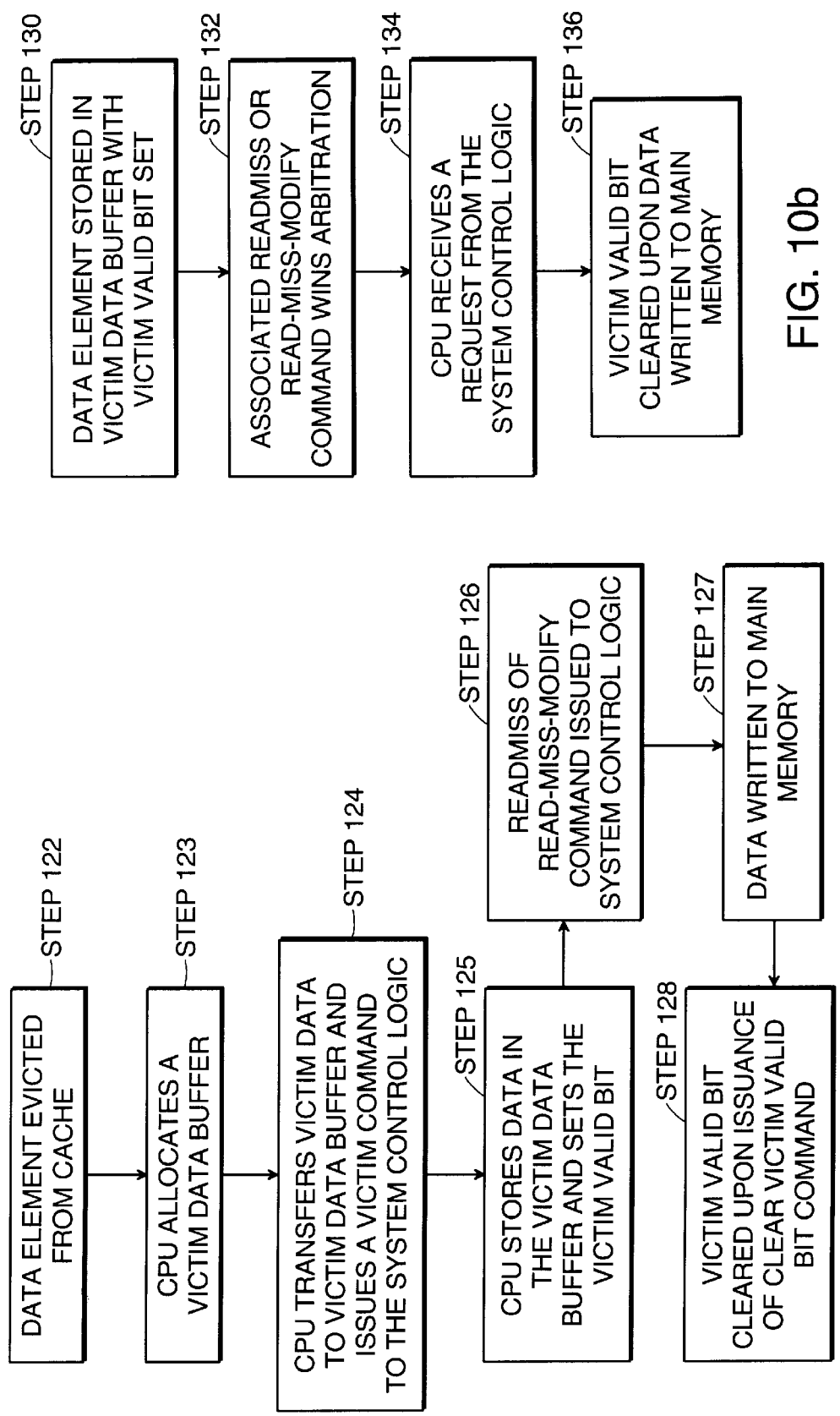

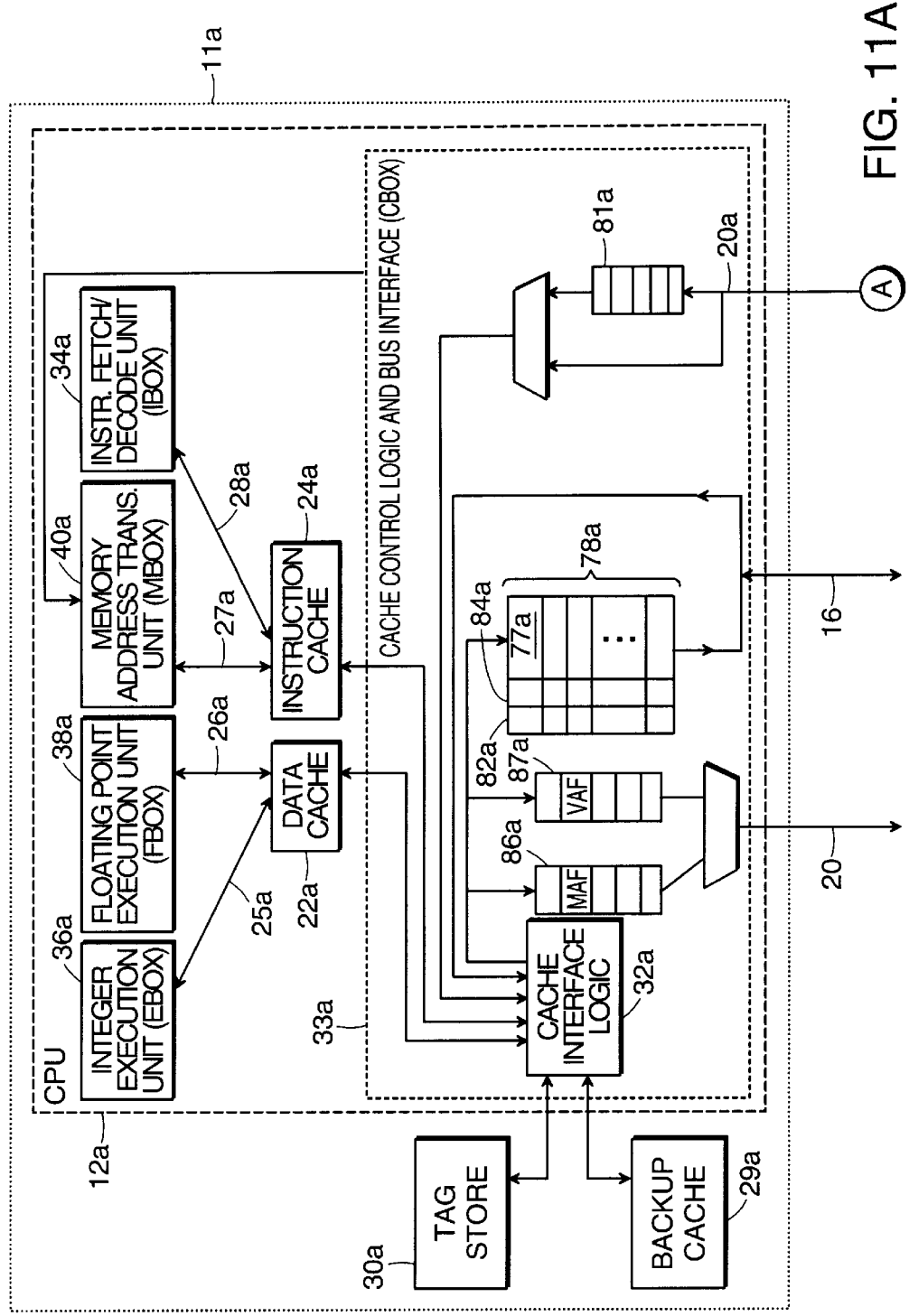

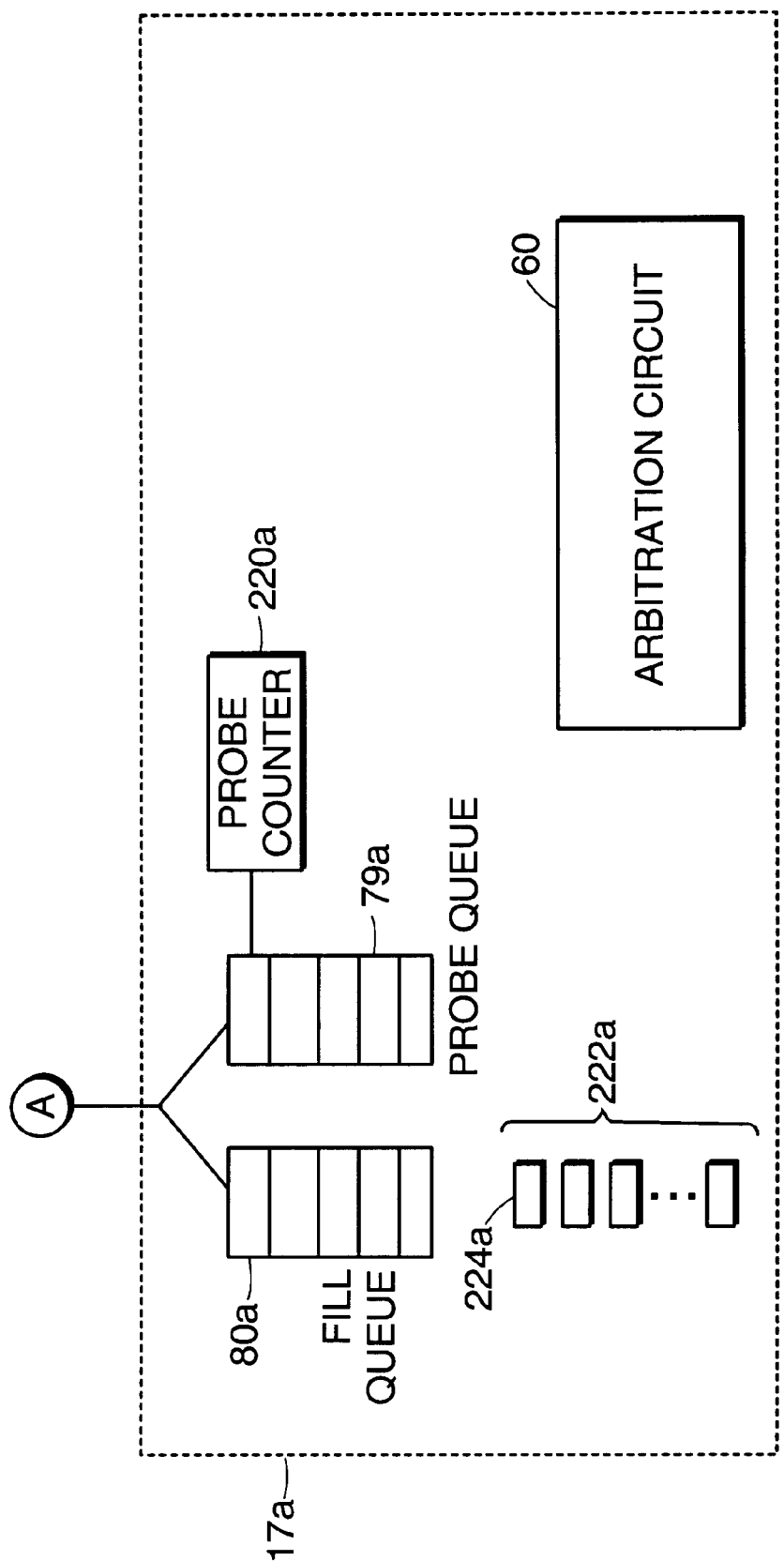

DISTRIBUTED DATA DEPENDENCY STALL MECHANISM

BACKGROUND OF THE INVENTION

This invention relates generally to computer systems and more specifically to the flow control of subsequent references to data elements in computer systems.

As it is known in the art, a multiprocessing computer system includes a plurality of central processing units (CPUs), a main memory and system control logic. Each CPU typically includes a cache for storing data elements that are accessed most frequently by the CPU. The system control logic provides a communication interconnect for data and commands sent between the CPUs and between the CPUs and main memory. The system control logic often includes a duplicate tag store and an arbitration circuit. The arbitration circuit produces a serial stream of command references which are derived from commands from all CPUs and is applied to the duplicate tag store and main memory. The duplicate tag store holds status information pertaining to data stored in the caches coupled to each of the CPUs. The duplicate tag store is coupled with the arbitration circuit so that it may operate on the serial stream of commands. It is therefore implemented remote from the CPUs.

Each CPU may issue a variety of commands to the system control logic dependent upon the current cache status of a given data element and the operation the CPU needs to perform on that data element. If a CPU needs to access a copy of a data element that is not already in its cache, it issues a "readmiss" command to the system control logic. That command will retrieve an up-to-date copy of the requested data element and store it in the CPU's cache. The associated status information will indicate that the data is in an unmodified state. If the CPU needs to modify a data element that is not already in its cache, it issues a "read-miss-modify" command to the system control logic. That command will retrieve an up-to-date copy of the requested data element and store it in the CPU's cache. The associated status information for this data block will indicate that the data is in an exclusive, modified state. When a data element is in this exclusive modified state, it is considered the "most up to date" copy of the data element in the system.

The system control logic receives commands from a plurality of CPUs. The system control logic includes an arbitration circuit through which these commands arbitrate for access to the system's duplicate tag store and main memory resources. The output stage of this arbitration circuit, referred to as the "system serialization point", produces a serial stream of CPU commands which are issued directly to the duplicate tag and the main memory. For each command in this serial stream, the system control logic performs a duplicate tag store lookup operation. This operation returns the cache status for each CPU, for the specific data element referenced by the command.

Specifically, the lookup operation will return status information indicating which CPUs have copies of the referenced data element and which of these copies is the most up-to-date version of the data element. Therefore, if memory does not have the most up to date version of the data in the system, the duplicate tag store will indicate which CPU does. When the system is processing a readmiss command or a read-miss-modify command it uses this information to determine whether to fetch data from main memory or another CPU. If it must fetch data from another CPU, it does so by issuing a message referred to as a "forwarded-read" or a "probe read" to that other CPU. Probe messages like the forwarded-read are issued to their target CPUs through a set of "probe queues" in the system control logic. Each CPU is associated with one probe queue from that set of probe queues.

The system control logic also executes a duplicate tag store update operation for each command in the serial stream. When the system control logic is processing read-miss or read-miss-modify commands, it updates the duplicate tag store state of the issuing CPU to indicate that the referenced block is now an element of the issuing CPU's cache. In response to a read-miss-modify command the system control logic also updates the duplicate tag to indicate that the copy of the data element in the issuing CPU's cache is the most up-to-date copy of the element in the system.

When the arbitration circuit of the system control logic issues a command to the duplicate tag store, it simultaneously issues the same command to the main memory of the computer system. If the command is a readmiss command or a read-miss-modify command and the duplicate tag indicates that the most up-to-date copy of the data element is in memory, then the system control logic will return a copy of the data element from main memory to the requesting CPU via a "fill" message. Similarly, if the duplicate tag indicates that the most up-to-date copy of the data element is in another CPU's cache, then the system control logic will return a copy of the data element from the other CPU to the requesting CPU, also via a fill message.

Readmiss and read-miss-modify commands that are serviced from data stored in another CPU, require the issuance and servicing of a probe read message. Because of these added operations it can take a longer amount of time to return a fill message for a readmiss or read-miss-modify command serviced from another CPU's cache than it does for a readmiss or read-miss-modify command that is serviced from main memory. All fill messages are returned to their issuing CPUs via a set of "fill queues" in the system control logic. Each CPU is associated with one fill queue from that set.

Since fill messages are returned to the issuing CPU with variable timing and since the fill queue and the probe queue associated with a given CPU operate independent from each other, it is possible for a probe message to reach the top of a CPU's probe queue before a fill message that was generated in response to a command issued to the system serialization point before the command that caused generation of the probe.

In such a computer system it is possible that a first CPU issues a read-miss-modify command to the system control logic, concurrently with a readmiss or read-miss-modify command issued from a second CPU that references that same data element, and wherein the most up-to-date copy of the data element resides in a third CPU's cache. If the read-miss-modify command from the first CPU is issued to the system serialization point before the readmiss command from the second CPU, then the duplicate tag store lookup for the read-miss-modify command from the first CPU will cause a first probe read message to be issued to the third CPU. The system control logic then updates the duplicate tag store to indicate that the first CPU now has the most up-to-date copy of the data in the system. When the arbitration circuit in the system control logic issues the second CPU's readmiss command, the associated duplicate tag store lookup will detect the duplicate tag store update from the first CPU's read-miss-modify command and a second probe read message will be issued to the first CPU. This second probe read message may reach the top of the first CPU's probe queue before the fill message associated with the first probe read message reaches that same CPU. Since the fill message associated with the first probe read contains the data required by the second probe read, the second probe read cannot be serviced.

Prior art systems have resolved this issue through a variety of means. Many computer systems, such as the AlphaServer 8000 series of computers manufactured by Digital Equipment Corporation, include arbitration circuits in the system control logic that block the issuance of the readmiss command from the second CPU until the fill message for the first CPU has reached the first CPU, or until that fill message is guaranteed to reach the first CPU before the second probe read message reaches the top of the probe queue. Implementations of such "arbitration blocking" mechanisms are either complex, e.g. where the mechanism blocks only references to a given data element, or present limitations to system performance, e.g. where the mechanism blocks access to an entire region of memory.

SUMMARY OF THE INVENTION

The invention resides in allowing each probe queue in a multiprocessor computer system to be individually stalled when a probe message, that targets data not yet stored in an associated cache or victim data buffer, reaches the top of that queue. Such an arrangement improves the performance of the computer system by allowing all regions of memory and all probe queues that are not associated with the stall condition, to remain in operation.

More specifically, a multiprocessor computer system utilizing the present invention operates as follows. When a first CPU in the computer system requires an element of a data block not stored in its cache, it issues a readmiss command to the system control logic to retrieve a specified data block. When the command wins arbitration in the system control logic, the entries of the duplicate tag store are compared with the address of the data block to determine if another CPU has a most up-to-date copy stored in its cache. Because the duplicate tag store entries are updated when each command wins arbitration rather than when the command is actually completed, it is possible for the duplicate tag store to indicate that a CPU has a most up-to-date copy of a data element that is still in the process of being retrieved. Therefore, the duplicate tag store could indicate that the cache of a second CPU has a most up-to-date copy of the specified data when, in fact, it is still in the process of retrieving that data. The system control logic will responsively place a probe read message on the second CPU's probe queue. If the data has not been retrieved by the second CPU before the probe message reaches that top of the probe queue, that queue will be stalled. The rest of the computer system will continue to operate as if that queue were not stalled, and therefore the performance of the other CPUs is not hampered.

BRIEF DESCRIPTION OF THE DRAWINGS

The foregoing features of this invention, as well as the invention itself, may be more fully understood from the following detailed description when read in conjunction with the accompanying drawings, in which:

FIGS. 10A and 10B depict flow diagrams of a separate probe and victim buffer read and release mechanism implemented by a CPU of the computer system of FIG. 1;

FIG. 11 depicts one of the central processing units of the computer system of FIG. 1, together with a probe counter and a plurality of victim release counters associated with that CPU and included in the address control chip;

DESCRIPTION OF A PREFERRED EMBODIMENT

Figure 1:
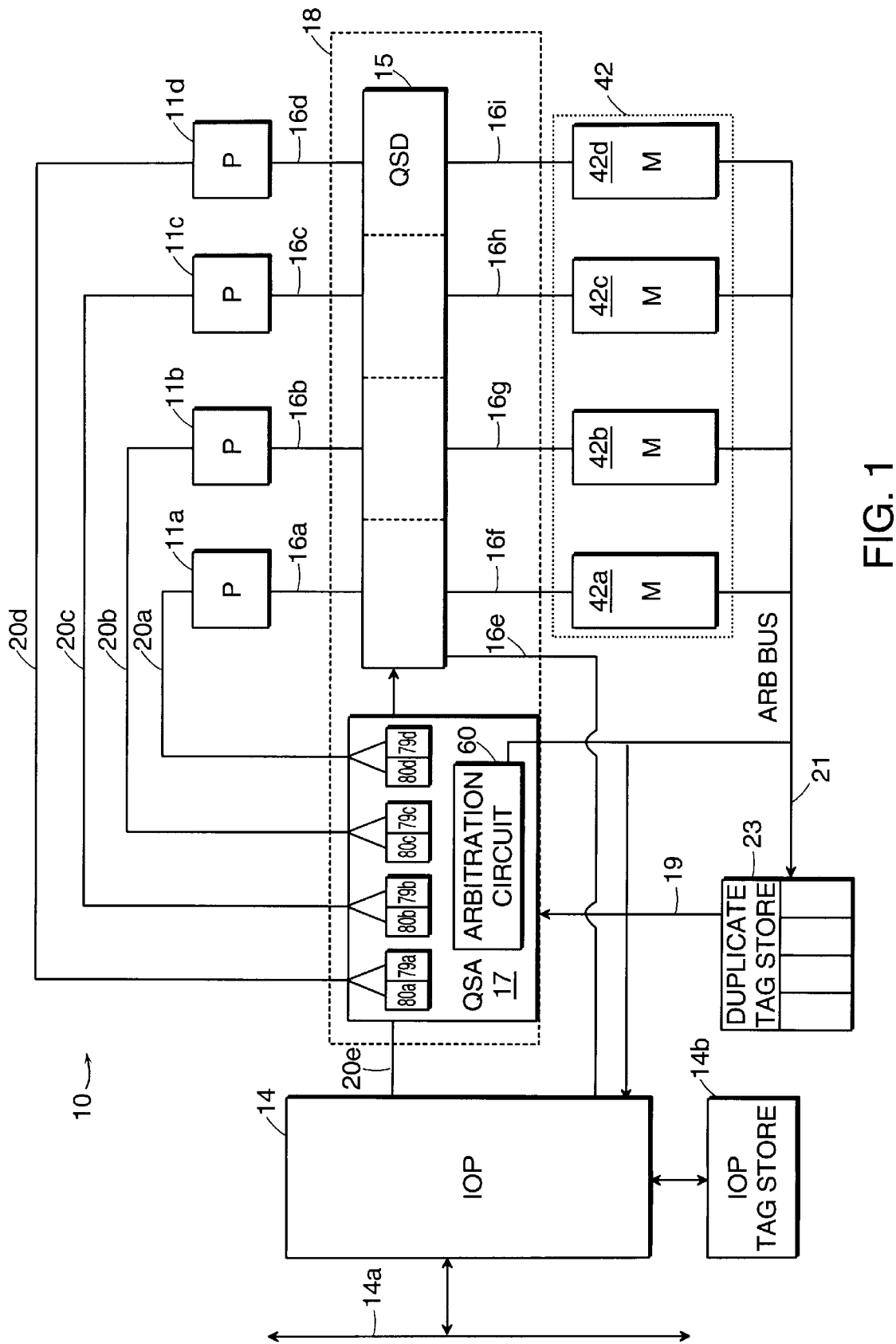
FIG. 1 is a block diagram of a computer system including multiple central processing units.

Referring to FIG. 1, a multiprocessor computer system is shown to include four processor modules 11a, 11b, 11c, and 11d, each including a central processing unit (CPU). In the preferred embodiment, Alpha® 21264 central processing unit chips manufactured by Digital Equipment Corporation®, are used however other types of processor chips capable of supporting the invention may alternatively be used.

The multiprocessor computer system 10 includes a memory 42 which may comprise a number of memory modules 42a–42d, a system control logic 18 and an I/O processor module (IOP) 14. The IOP 14 is coupled to an I/O bus 14a, such as a Peripheral Computer Interconnect (PCI) bus for transferring data to and from the multiprocessor computer system 10 and external devices as set forth in the applicable PCI standards. Associated with the IOP 14 is an IOP tag store 14b, for storing addresses and coherency status information relating to data that is being used by the external devices.

The IOP 14, processor modules 11a–11d and memory modules 42 are coupled to the system control logic 18 by bi-directional data links 16a–16i and address links 20a–20e. The QSD devices 15 of the system control logic 18 provide a switch interconnect for data sent between the processor modules 11a–11d, memory modules 42a–42d and IOP 14. The QSD devices 15 are slaved to the control signal sent from the address control chip 17. FIG. 1 shows four QSD devices included in the system control logic 18, with each QSD device controlling a portion of the data path. Other embodiments may use more QSD devices depending on the width of the data path that is implemented.

The system control logic 18 includes an address control chip (QSA) 17 and data slice chips (QSDs) 15. The address control 17 is a master controller for all command paths to processor modules 11a–11d, and to the IOP module 14. The address control chip 17 provides control signals to the QSD devices 15 for controlling the switch interconnect and the data interconnect between the QSDs and each of the processor modules. The address control chip 17 also includes a central arbitration circuit 60 for determining the order in which processor requests are serialized and receive access to a remote duplicate tag store 23 and to main memory 42. The address control chip 17 serializes commands, such that one per cycle wins arbitration and is asserted on the arbitration (Arb) bus 21.

Address control chip 17 further includes fill queues 80a–80d and probe queues 79a–79d. Each probe and fill queue is associated with one of the processor modules 11a–11d. Each probe and fill queue provides probe messages and fill messages, respectively, in a first in first out (FIFO) manner to the processor module to which it is coupled. A probe message, or simply a probe, is issued by the system control logic in response to a request by a processor module or the IOP 14 to retrieve (probe read message) or change the status of (probe invalidate message) a most recent version of a data element that is stored in another processor's cache memory. For example, as each command wins arbitration in the arbitration circuit 60, the address control chip 17 performs a duplicate tag store lookup operation for the data element targeted by the command. This lookup operation indicates which CPU has a most up-to-date copy of the targeted data element stored in its cache or, alternatively, indicates that main memory 42 contains the most up-to-date copy. If the command that won arbitration is a request to retrieve a copy of the targeted data (a readmiss command) the address control chip 17 uses the result of the duplicate tag store lookup operation to determine whether to retrieve it from main memory or from another CPU's cache. If it must retrieve the data from another CPU's cache it does so by issuing a probe read message to that CPU through the associated probe queue. When the probe message reaches a point in the CPU where the target address of the probe can be compared against the entries of its local tag store, it is referred to as being at the "top" of that probe queue and can be processed by the CPU.

In reply to a probe message that has reached the top of the probe queue, the associated processor initiates a probe response in which the system control logic 18 is notified that the probe message's target address has been compared against the entries of the local tag store. When the probe message is a probe read message, the probe response indicates that the data targeted by the probe message is ready to be transferred to the system control logic 18. The system control logic 18 then commands the central processing unit to transfer the data and incorporates it in a fill message. The fill message is placed on the fill queue of the central processing unit that issued the associated readmiss command, i.e. the requesting CPU, such that the data will be stored in the cache memory of the requesting CPU.

The shared, serially accessed duplicate tag store (dtag) 23 is used to maintain data coherency within the multiprocessor computer system 10. The duplicate tag store 23 receives commands from the address control chip 17 via arb bus 21 and transfers information to the address control chip 17 via bus 19. The duplicate tag store 23 is further coupled to memory modules 42a–42d by arb bus 21 and is partitioned into a plurality of storage locations for retaining the tag addresses of data elements stored in the backup cache memories of each processor module 11a–11d. These tag addresses are referred to as backup cache tags or duplicate tags and allow the address control chip 17 to quickly determine the state of each data element stored in a given processor module's cache memory. Based on this information, the address control chip 17 will issue probe messages only to processors that have a most up-to-date copy of the requested data.

Figure 2:
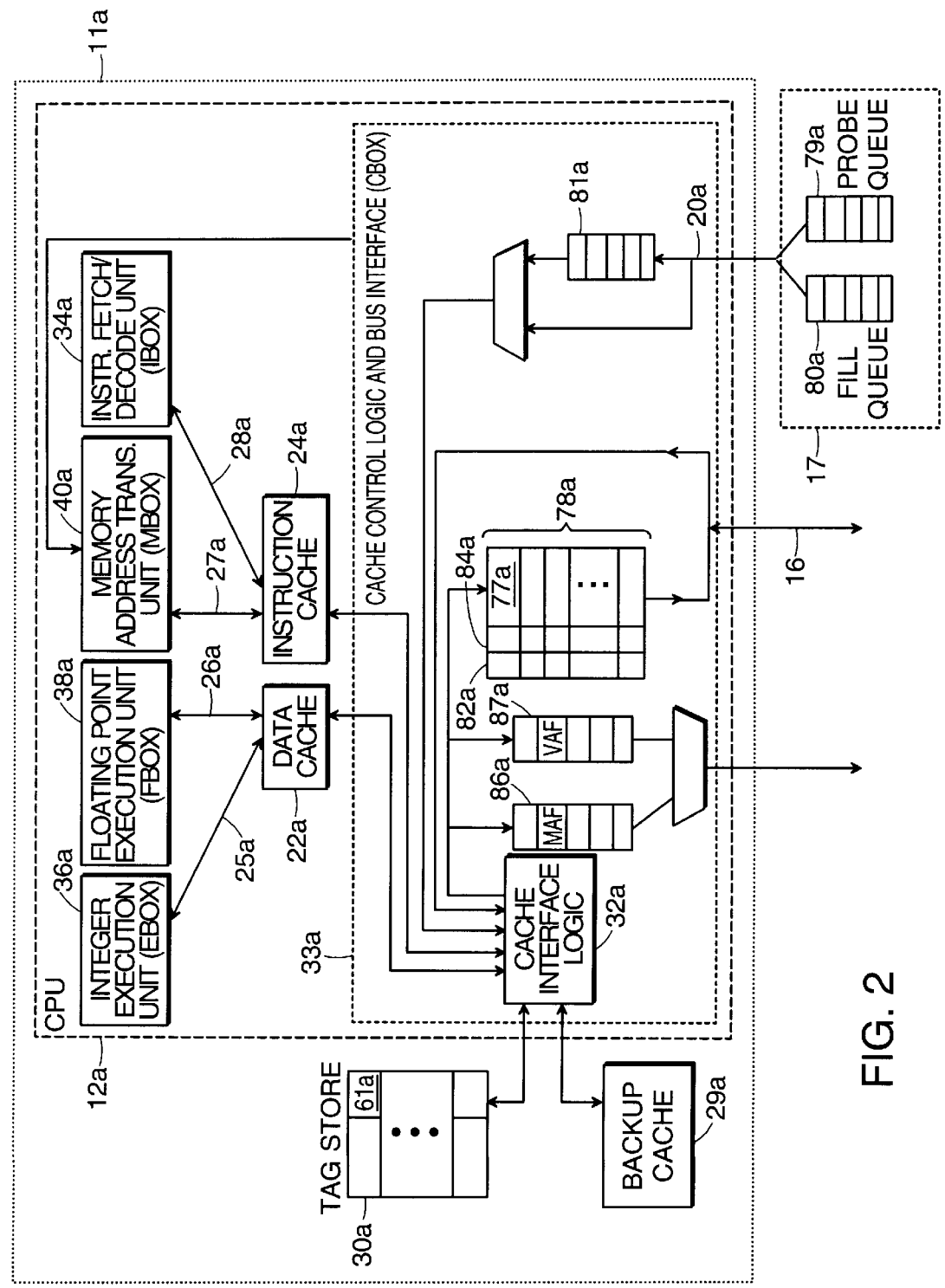
FIG. 2 depicts one of the central processing units of FIG. 1.

Referring now to FIG. 2 processor module 11a, representative of processor modules 11b–11d of multiprocessor computer system 10, is shown in more detail. Processor module 11a is shown coupled to its associated probe queue 79a and fill queue 80a via bus 20a. In addition, processor module 11a includes an internal probe queue 81a that functions as an extension of probe queue 79a. Processor module 11a also includes a central processing unit (CPU) 12a, a backup cache 29a, and a backup cache tag store 30a. Data cache 22a is typically smaller and faster than backup cache 29a. The tag portion of each backup cache entry's address, as well as its status flags, are stored in tag store 30a. The status flags include a dirty bit, a valid bit, and a shared bit. The valid bit indicates that the data is the most recent version of the particular data element. The dirty bit indicates that the data has been modified since it was retrieved and thus indicates that the CPU coupled to the cache is the "owner" of the data. Being the owner of a data element means that the coupled CPU is responsible for servicing all requests that target that data until another processor takes ownership of the data, or until the command to write the data back to main memory wins arbitration. The shared bit indicates that another CPU also has an identical copy of the data element stored in its cache.

The status flags stored in tag store 30a are similar to the status "code" stored in duplicate tag store 23 (shown in FIG. 1). That status code indicates whether the entry is valid, invalid, dirty-probed, or dirty-not-probed. As in tag store 30, the valid and invalid portions of the status code indicate whether or not the associated CPU has an unmodified copy of the data. The dirty-probed portion of the status code indicates that the associated processor has a dirty copy of the data and that a probe read message has been previously issued to that CPU to retrieve a copy of it. Likewise, the dirty-not-probed portion of the status code indicates that the associated CPU has a dirty copy of the data but a probe read message has not previously been issued to the CPU to retrieve it. Accordingly, the status information stored by tag store 30 and by duplicate tag store 23 are not identical.

CPU 12a includes several groups of logic that enable it to perform the major operations that the computer system 10 requires. The Ibox 34a, or instruction fetch and decode unit, controls instruction pre-fetching, instruction decoding, branch prediction, instruction issuance, and interrupt handling. The Ebox 36a, or integer execution unit, handles the functions of addition, shifting, byte manipulation, logic operations, and multiplication for integer values stored in the system. These same operations, for floating point values, are controlled by the Fbox 38a, or floating point execution unit. The Mbox 40a, or memory address translation unit, translates virtual addresses, generated by programs running on the system, into physical addresses which are used to access locations in the computer system 10. The Ebox 36a and Fbox 38a operate on data items and are primarily coupled to Data cache 22a via busses 25a and 26a respectively. Also, Mbox 40a and Ibox 34a are coupled to the Instruction cache 24a via busses 27a and 28a respectively.

Lastly the Cbox 30a, or cache control and bus interface unit, includes logic for controlling the backup cache 29a, memory related external interface functions, and all accesses initiated by the Mbox 40a. The Cbox 30a also includes victim data buffers 78a, a victim address file (VAF) 87a, and a miss-address file (MAF) 86a for operations related to retrieving data elements. The victim data buffers 78a store data elements that have been evicted from backup cache 29a. The VAF 87a stores the addresses of data elements stored in each victim data buffer. Also, the MAF 86a stores a copy of each command that central processing unit 11a issues to the system but which has not yet completed. Further, the Cbox 30a also includes a path for probe and fill messages to enter the central processing unit 11a and operate on specified data stored in cache memory or in the victim data buffers. The path is an extension of probe queue 79a and fill queue 80a and includes an internal probe queue 81a for probe messages, and a bypass path for fill messages, as will be described in more detail below.

I. Distributed Data Dependency Stall Mechanism

Figure 3:
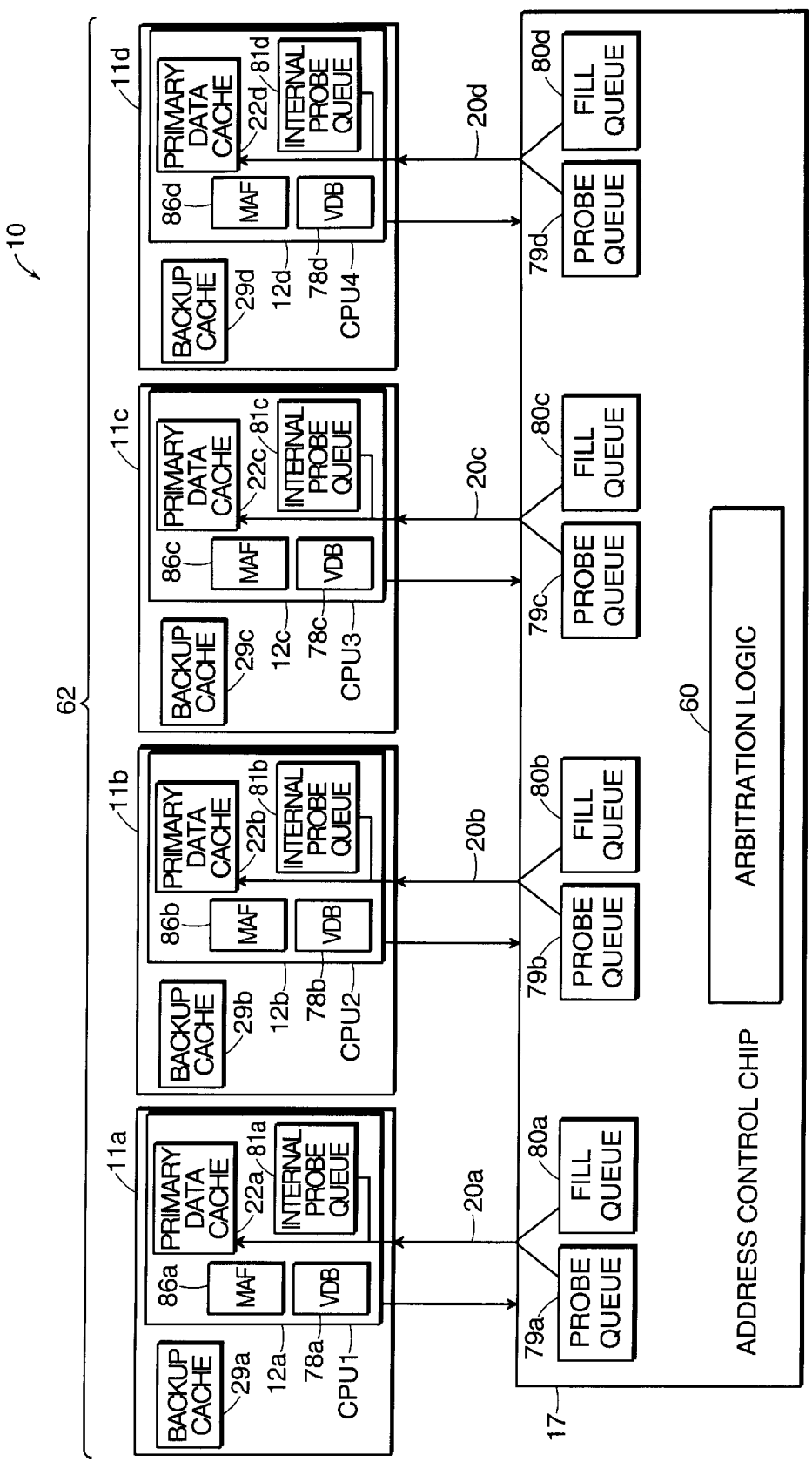
FIG. 3 depicts a block diagram of several central processing units of the computer system of FIG. 1.

Referring now to FIG. 3, a simplified depiction of a multiprocessor computer system 10 is shown to include a plurality of processor modules 11a–11d in relation to address control chip 17. Each processor module 11a–11d is minimally shown to include a Central Processor Unit 12a–12d, and a backup cache 29a–29d. Each CPU 12a–12d is shown to include a miss-address file (MAF) 86a–86d, a set of victim data buffers (VDB) 78a–78d, an internal probe queue 81a–81d and a primary data cache 22a–22d as described above. The processor modules 11a–11d are coupled to the address control chip 17 which includes the central arbitration circuit 60, and a probe and fill queue pair (79a–79d and 80a–80d) for each processor module 11a–11d.

During normal operation, a central processing unit 12a–12d will attempt to retrieve data elements from its primary data cache 22a–22d and backup cache 29a–29d before issuing a command to the system control logic to retrieve the requested data. If the memory block that contains the requested data is not stored in the CPU's cache, a cache miss occurs and the data must be retrieved from another source such as main memory 42 or another CPU's cache.

In order to retrieve the data from a source other than an attached cache, the CPU issues a command to the system control logic 18. If the CPU only needs to access the data, it issues a readmiss command to the system control logic 18.

That command will cause the system control logic 18 to retrieve the most up-to-date copy of the requested data element and store it in the CPU's cache. The associated status information will be updated to indicate that the data is in an unmodified state. If the CPU needs to modify the data, it issues a read-miss-modify command to the system control logic 18. The read-miss-modify command will cause the system control logic 18 to retrieve an up-to-date copy of the data, invalidate all other copies of that data via a probe invalidate message, store it in the requesting CPU's cache and update the associated status information to indicate that the data is in an exclusive modified state. When a data element is in an exclusive state it means that it is stored only in that cache and, therefore, is considered the most up-to-date version in the computer system. When a readmiss or read-miss-modify command is issued, it is input to central arbitration circuit 60.

Central arbitration circuit 60 includes an arbitration algorithm for determining the order in which the command will gain access to the duplicate tag store 23 and main memory 42. Such arbitration algorithms can include round-robin arbitration which is well known in the art and will not be explained further. Further, central arbitration circuit 60 operates responsive to the number of probe messages stored on each of the probe queues. When one of the probe queues becomes "full", i.e. when each of its entries is filled with a pending probe message, the central arbitration logic is stalled by the address control chip 17. When the central arbitration logic 17 is stalled, commands that are issued to the address control chip 17, from the central processing units, will not be input to the central arbitration circuit until the full probe queue has a predetermined number of free locations. Also, the central arbitration circuit 60 will be prevented from issuing any more probe messages to the system serialization point. For example, when the probe queue is full, a full flag coupled to the probe queue, is set. At this point the central arbitration circuit 60 will be prevented from issuing further probe messages to the system serialization point. Eventually, as the associated central processing unit processes probe messages that reach the top of the probe queue, entries of the probe queue will be made available to hold further probe messages. When a predetermined number of entries are available, an almost-full flag will be set. Responsively, central arbitration circuit 60 will resume normal operation.

When a readmiss or read-miss-modify command wins arbitration, the system control logic 18 performs a lookup operation on the entries of duplicate tag store 23 to determine if a most up-to-date version of the requested data is stored in one of the backup cache memories 29a–29d of the Central Processor Units 11a–11d. Concurrently, an access of main memory 42 is initiated. If none of the backup cache memories 29a–29d have a most up-to-date copy of the data, it is retrieved from main memory 42. Alternatively, if an up-to-date copy of the requested data is stored in another CPU's cache, a corresponding probe read message (and for read-miss-modify commands, a probe read-invalidate message) is placed on the probe queue 79a–79d of the central processing unit that has the requested data stored in its backup cache 29a–29d. After comparing the address of the requested data with the addresses of data stored in its cache, the central processing unit storing the requested data replies to the probe read message by initiating a probe response. The probe response indicates to the system control logic 18 that the requested data is ready to be accessed. Subsequently, the system control logic obtains a copy of the data and incorporates it in a fill message placed on the fill queue of the requesting CPU. When the fill message reaches the top of the fill queue, the data is stored in cache.

It should be noted that if the command was a read-miss-modify command, the status of any other entry in the duplicate tag store 23 that matches the data targeted by the command, is changed to invalid via a probe invalidate message issued to each CPU other than the one which is supplying the data. When a read-miss-modify command wins arbitration, a probe read-invalidate message is issued to the CPU that owns the data and a probe invalidate message is issued to other CPUs that are storing copies of the data. A probe read-invalidate message retrieves a copy of the data from a CPU and also changes its status in that CPU to invalid. The copies of the data in that CPU and all other CPUs are invalidated because the requested data is to be modified by the requesting CPU. Accordingly, the modified value will thereafter be the only valid copy of the data and, because of the invalidation of the other CPU's entries in duplicate tag store 23, the system will no longer issue probe read messages to retrieve the data from those sources. In addition, future probe messages are directed to the CPU that issued the read-miss-modify command so that the up-to-date version of the data is retrieved from its cache memory.

Before a readmiss or read-miss-modify command is to be issued to retrieve a requested data element, a determination is made as to the location where the requested data element will be stored in cache. When a data element is already stored at that location the CPU needs to displace the stored data to make room for the requested data. Such evicted data is referred to as "victim" data. When the status of the victim data is modified, or dirty, it should be written into main memory to preserve that modified value. The CPU writes victim data back to memory by issuing a "victim" command along with the associated readmiss or read-miss-modify command. The combination of commands is referred to as a readmiss/victim or read-miss-modify/victim command pair. While waiting to be written back to main memory, the victim data is stored in a victim data buffer in the CPU. By displacing the modified data to a victim data buffer 77, storage space is released in the cache while allowing a copy of the victim data to be accessed until all probe messages that were issued to the CPU before the associated victim command won arbitration have passed through the probe queue 79.

Probe messages and fill messages pass through separate and independently operating probe queues and fill queues before being input to the CPU to which they were issued. Probe messages and fill messages also require access to different sets of system resources. Fill messages require access to the CPU's command bus, data bus and cache. Probe messages, on the other hand, require access to the CPU's address bus, data bus and internal buffer resources. Although these sets of system resources overlap to some extent, the specific dependencies are unique, i.e. probe messages use resources that drive data to the system control logic while fill messages use resources that drive data from the system control logic to a CPU. As a result of this difference in resources, probe messages in the probe queue may make progress slower than fill messages in the fill queue, and vice versa. The most likely condition is that the probe messages will progress slower than the fill messages because of the probe message's dependence on the internal processor buffer resources. Accordingly, by segregating the two types of messages, the faster executing fill messages are not delayed by the slower executing probe messages and, in certain circumstances, vice versa. Further, since the speed of a computer system is largely determined by the time it takes to retrieve data, such an architecture greatly improves the rate at which requested data is stored in cache and therefore improves system performance.

As described above, the probe messages and the fill messages can execute at different speeds. However, a problem arises whenever a probe read message reaches the top of the probe queue 79 before a fill message containing the requested data reaches the top of the fill queue with that data. In this situation, the data is not present to satisfy the probe message, and therefore the probe queue 79 is stalled until the data is retrieved and stored in the cache. System performance can be improved by allowing individual probe queues to be stalled without stalling the entire system, i.e. by distributing such data dependent probe queue stalls. With such an arrangement, a series of probe messages targeting the same data can be chained together, e.g. a first probe message can be issued to a first CPU which has an associated second probe message that is in the process of retrieving the requested data from a second CPU.

In such a computer system it is possible that a first CPU issues a read-miss-modify command to the system control logic, concurrently with a readmiss or read-miss-modify command issued from a second CPU that references that same data element, and wherein the most up-to-date copy of the data element resides in a third CPU's cache. If the read-miss-modify command from the first CPU is issued to the system serialization point before the readmiss command from the second CPU, then the duplicate tag store lookup for the read-miss-modify command from the first CPU will cause a first probe read message to be issued to the third CPU. The system control logic then updates the duplicate tag store to indicate that the first CPU now has the most up-to-date copy of the data in the system. When the arbitration circuit in the system control logic issues the second CPU's readmiss command, the associated duplicate tag store lookup will detect the duplicate tag store update from the first CPU's read-miss-modify command and a second probe read message will be issued to the first CPU. This second probe read message may reach the top of the first CPU's probe queue before the fill message associated with the first probe read message reaches that same CPU. Since the fill message associated with the first probe read contains the data required by the second probe read, the second probe read cannot be serviced.

Delays caused by the above mentioned situation are prevented in the computer system shown in FIG. 3 where the individual probe queues can be stalled by the central processing unit 12a–12d attached thereto. As previously stated, each CPU 11a–11d includes a miss address file which stores references to each data element for which that CPU has issued a readmiss or read-miss-modify command that has not completed. The attached processor module 11a–11d will not process a probe message that reaches the top of probe queue 79 if the associated miss address file 86a–86d contains a reference for the data targeted by that probe message. Accordingly, the central processing unit 12a–12d compares the target address of the probe message with each entry in its MAF 86a–86d. If a match is detected the processor stalls the probe queue by allowing the probe message to remain at the top of the probe queue without being processed until the requested data is returned via a fill message and the corresponding entry in the MAF is deleted. Meanwhile, the other probe queues in the system continue to operate normally. Therefore the architecture of the computer system 10 prevents the above mentioned problem from occurring by allowing individual probe queues to be stalled by their associated CPUs without stalling the entire system.

Figure 4:
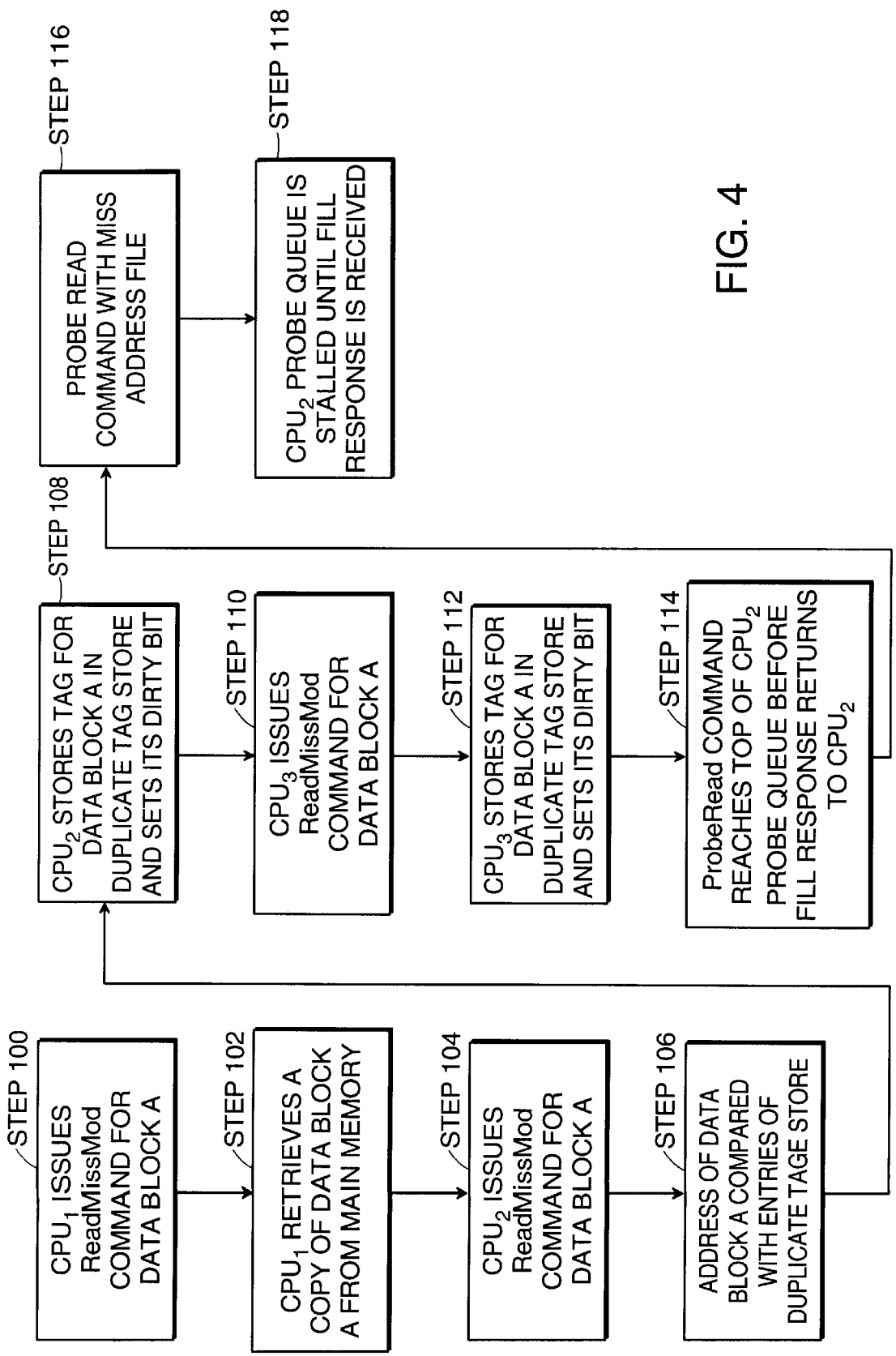
FIG. 4 is a flow diagram of the distributed data dependency stall mechanism implemented by a CPU of the computer system of FIG. 1.

Referring now to FIG. 4, a flow diagram depicts the functionality of the computer system's central processing units and their associated logic with respect to issuance of a readmiss or read-miss-modify command and the corresponding probe read message. Consider a multiprocessor computer system 10, such as depicted in FIG. 3, comprised of a plurality of CPUs 12a–12d (hereinafter $CPU_1$, $CPU_2$, $CPU_3$, and $CPU_4$ respectively). A sequence of commands is issued wherein $CPU_1$ first issues a read-miss-modify command for data block A (step 100) to the system control logic 18. After the command wins arbitration, the address control chip 17 determines that the most up-to-date copy of data block A is stored in main memory 42. The address control chip 17 updates the corresponding entry in the duplicate tag store 23, retrieves a copy of data block A from main memory 42 and incorporates it in a fill message placed on fill queue 80*a* (step 102). Following these events, $CPU_2$ also issues a read-miss-modify command targeting data block A (step 104). When that read-miss-modify command for data block A wins arbitration, the address control chip 17 performs a lookup operation wherein the duplicate tag store 23 compares the data block's address with each of its entries, and sends the result to the address control chip 17 (step 106). The address control chip 17 is informed that $CPU_1$ has a dirty copy of the data and therefore updates the appropriate duplicate tag store entries to indicate that $CPU_2$ now has an exclusive, modified copy of data block A and issues a probe read and probe read-invalidate message to retrieve the data from $CPU_1$ and invalidate the remaining copy. Although the read-miss-modify command from $CPU_2$ has just won arbitration and hence has just begun the process of retrieving data block A, the associated tag in duplicate tag store 23 indicates that $CPU_2$ is the only owner, that the data has been retrieved and that it has been modified (step 108). Therefore the duplicate tag store entry is updated based upon the order of command issuance on the arb bus rather than the order of command completion.

Following the issuance of the read-miss-modify command from $CPU_2$, $CPU_3$ also issues a read-miss-modify command for data block A (step 110). When the read-miss-modify command from $CPU_3$ wins arbitration, the address control chip 17 will determine from the duplicate tag store lookup that data block A can be retrieved from $CPU_2$'s cache. Such a determination is based upon the fact that the corresponding duplicate tag store entry was changed to indicate that $CPU_2$ is the owner of data block A. However, $CPU_2$ is still in the process of retrieving the data from the $CPU_1$'s cache. When the read-miss-modify command issued by $CPU_3$ won arbitration, the duplicate tag store entries were updated to indicate that $CPU_3$ owns data block A (step 112).

Thereafter, CPU, issues a probe response and the address control chip 17 places a fill message containing data block A on the fill queue for $CPU_2$. The probe read message, associated with the read-miss-modify command issued from $CPU_3$, reaches the top of $CPU_2$'s probe queue before the fill message associated with the read-miss-modify command issued from $CPU_2$ returns the requested data (step 114). As suggested above, the present invention includes a mechanism for preventing a system-wide stall condition by allowing each probe queue to be stalled individually until the requested data is retrieved, while also retaining cache coherency. Accordingly, when the probe read message associated with the read-miss-modify command from $CPU_3$ reaches the top of $CPU_2$'s probe queue, it is compared against the entries of the associated miss-address file 86*b* to determine if a command has been issued by $CPU_2$ to retrieve data block A (step 116). Because the miss address file 86*b* indicates that $CPU_2$ has an outstanding read-miss-modify command to retrieve data block A, the probe message will remain unprocessed (the probe queue is stalled) until the data is actually stored in cache (step 118).

Accordingly, the method of the present invention specifies that if a probe read message arrives at the top of a CPU's probe queue, and the CPU has an outstanding readmiss or read-miss-modify command for the same address, as evidenced by a corresponding miss-address file entry, the CPU's probe queue is stalled until the associated fill message is received and the data stored in cache. Using this method, only the probe queue in question is stalled, while the rest of the system can continue normal operations.

Because probe messages are issued to a CPU based upon the order that commands win arbitration rather than the order of command completion, more than one probe message, targeting the same data block, can be "chained" together. A set of probe messages are considered chained together when each has been issued to a CPU that is in the process of retrieving the targeted data. As the data is returned to each CPU in succession, each probe message waiting for that CPU to retrieve the data is serviced. Where a command reaches the top of a probe queue before the requested data is retrieved, it is stalled by the associated CPU until the associated fill message retrieves the data. For example, a probe message targeting data block B, can be placed on a probe queue associated with a first CPU which is in the process of retrieving data block B from a second CPU which is also in the process of retrieving data block B from a third CPU, and so on. As each CPU receives a copy of the data, its probe queue is restarted, the probe message at the top of the probe queue is serviced, and the data can be passed to the next CPU in turn.

It should be noted that this mechanism can only work in a system having a duplicate tag store 23 or similar logic that represents the status of data stored in the associated CPU's cache, otherwise the system will deadlock.

Figure 5:
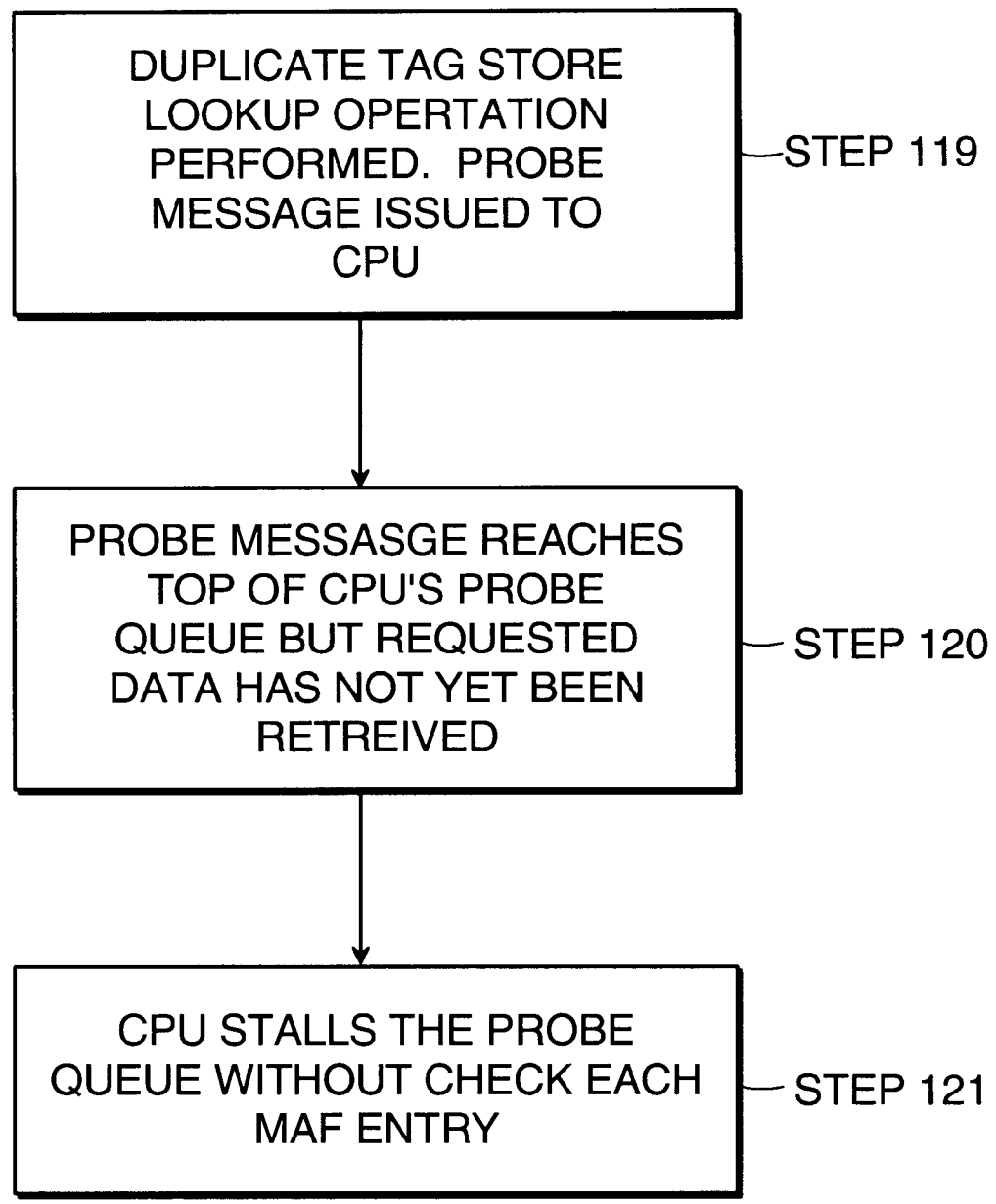
FIG. 5 is a flow diagram of an embodiment of the distributed data dependency stall mechanism implemented by a CPU of the computer system of FIG. 1.

Referring now to FIG. 5, a block diagram depicts an optimization of the present invention for allowing distributed data dependent stalls. Such an optimization saves cycle time otherwise used to compare the address of a requested data element with each of the miss address file entries. As stated above, before a probe message is issued to a specified CPU, the duplicate tag store is checked to determine that the targeted CPU appears to have an up-to-date version of the requested data in its cache (step 119). The optimization is that if a probe message reaches the top of that CPU's probe queue but the data is not stored in the cache or in a victim data buffer (step 120), the probe queue is stalled without checking the miss-address file for an outstanding access which targets the requested data (step 121). Such an embodiment presumes that the probe message would not have been sent to the CPU if there had not been an outstanding readmiss or read-miss-modify command issued to retrieve the data, and hence a corresponding miss address file entry. This embodiment only works where each CPU always updates the duplicate tag store 23 before invalidating data elements, and where the duplicate tag store 23 is a perfect filter. A perfect filter only indicates that a CPU is the owner of a data element if it has already retrieved the requested data or has an outstanding request to retrieve the data element which will complete before the probe message reaches the top of the associated probe queue.

II. Independent Victim Buffer and Probe Buffer Release Control

Referring again to FIG. 2, a CPU 12*a* is further shown coupled to a primary data cache (Dcache) 22*a*, and a backup cache (Bcache) 29*a*. Because the Dcache 22*a* is located on the CPU chip 12, its interface is closely coupled to the CPU 12*a* and therefore data can be accessed using a very short cycle.

Alternatively, the Bcache 29*a* is located off the CPU chip 12*a* and includes memory elements that are functionally slower than those that comprise the Dcache 22*a*. Because of the location and relative speed of Bcache 29a, data access is slower but storage capacity is greater than Dcache 22a and therefore a greater probability exists that a specified data block will be stored therein.

In order for such a cache memory to remain effective, CPU 12a uses one of a variety of replacement algorithms to determine when to displace the least useful data blocks. By replacing the least useful data blocks with those having a higher potential of being accessed, the overall performance of the computer system is increased. The least useful cache data blocks are replaced when the associated CPU requires access to data that is not stored in the cache. In such a case, before a command to retrieve the data block containing the required data is issued to the system control logic, a determination is made as to where in cache the new data will be placed. If another data block is stored in that location, the existing data block is removed, or "evicted". The data that is evicted is referred to as "victim" data. Depending on the architecture of the cache memory, the victim data is written back to main memory 42 if it has been changed, or simply discarded if it has not. Associated with each cache memory is a set of buffers, referred to as victim data buffers 78a. The victim data that is displaced from the cache is stored in one of these victim data buffers 78a, and its address stored in the victim address file, before it is written back to main memory 42, before it is discarded, or while that data is required to satisfy probe messages that were issued before an associated victim command won arbitration in arbitration circuit 60.

There are several types of cache configurations which can be used for Bcache 29a. For illustration purposes, FIG. 2 depicts a write back cache configuration although it will be apparent to one of ordinary skill in the art that the present invention is not limited to a single cache architecture. Other types of cache architectures, capable of supporting the invention, may alternatively be used.

When a CPU modifies data stored in a write-back cache, the modified data continues to be held in that cache. The modified data is written back into main memory 42 when the cache control logic replaces it with a new data block that maps to the same cache storage location. Modified data stored in cache is referred to as "modified" or "dirty" because its value is different than the copy of the data stored in the corresponding main memory location. As previously mentioned, status information in tag store 30a and in duplicate tag store 23, associated with the modified data indicates whether the data held in the cache is dirty and whether the owner CPU has the only current version of the data in the computer system 10 (i.e. that the CPU has the most up-to-date copy of the data).

When a cache is accessed to retrieve data that is not stored therein, referred to as a cache miss, the data block that contains the data element is retrieved from another source, i.e. main memory or another CPU having a most up-to-date copy of the data block. Retrieval of the data block is performed via the issuance of a readmiss or read-miss-modify command, to the system control logic. When the associated cache miss is detected, the dirty data block is evicted from the cache. Once the victim address and data is stored in a victim data buffer, a readmiss or read-miss-modify command and a victim command (referred to as a readmiss/victim or read-miss-modify/victim command pair) is issued to the system control logic to retrieve the requested data and to write the victim data back to main memory 42.

When such a readmiss/victim or read-miss-modify/victim command pair wins arbitration, the duplicate tag store update operation associated with that command pair modifies the duplicate tag store entry associated with the requested data element to indicate that the associated victim data is no longer an element of the requesting CPU's cache and to indicate that the requested data element is stored in the requesting CPU's cache. Also, the system control logic lengthens the main memory access associated with the readmiss command to include a victim write cycle for writing the victim data to main memory.

In prior art systems the situation can arise wherein a first CPU of the computer system issues a readmiss/victim command pair that victimizes a specified data block while, concurrently, a second CPU issues a readmiss command that requires a copy of the same data element. If the readmiss/victim command pair wins arbitration in the system control logic before the readmiss command, the duplicate tag store is updated to indicate that the first CPU no longer has a copy of the victim data stored in its cache. subsequently, when the readmiss command wins arbitration, it will therefore be satisfied from main memory. If, on the other hand, the readmiss command wins arbitration before the readmiss/victim command pair, the results of the duplicate tag store lookup associated with the readmiss command will indicate that the most up-to-date copy of the data requested by the second CPU is stored in the first CPU. The system control logic will responsively issue a probe message to the first CPU. In this situation it is essential that the first CPU is able to provide copies of the modified victim data to both the victim write to main memory 42 and to the probe message, to maintain proper system operation.

Providing data in response to readmiss/victim command pairs and probe messages, is further complicated due to the interactions between fill and probe messages. Fill messages and probe messages travel in independent fill and probe queues between the arbitration unit of the system control logic and the targeted CPU. Because of the difference in progress speeds, a fill message can return data that is targeted by the readmiss command portion of a readmiss/victim command pair, to the issuing CPU before a probe message, issued by the system control logic prior to the issuance of the readmiss/victim command, reaches the top of an associated probe queue. This fill will overwrite the copy of the victim data in the issuing CPUs cache. If the probe message requires access to a copy of the victim data associated with the readmiss/victim command pair, the CPU and/or system control logic must therefore provide a copy of this data from a source other than the cache.

Typically, a victim data buffer is loaded with a copy of the victim data element prior to issuing the readmiss/victim command pair to the system control logic. That copy of the victim data is kept in the victim data buffer until the system control logic determines that all probe messages that require a copy of the victim data have been satisfied and that the main memory victim write operation has been satisfied. This determination is made using a three step process. The first step involves a determination of whether every probe message in the system, that requires data stored in the victim data buffer, has performed an "address comparison". The address comparison is a comparison of the target address of each probe message against the address of the victim data, to indicate whether the probe message actually requires a copy of the victim data. The second step involves determining, in the case where the address of at least one probe matched the address of the victim data buffer element, that a copy of the victim data has been transferred to the system in response to the last probe that required the data. The third step involves monitoring the victim write operation, that writes the victim data to main memory, and monitoring each probe that requires access to the data stored in the victim data buffer to determine when all have been serviced. The present invention simplifies the second step of the above mentioned determination through the use of flags referred to as a victim valid bit and a probe valid bit associated with each victim data buffer in the system.

Considering the operation of the victim valid bit, when the victim data is transferred to a victim data buffer, the associated victim valid bit 82a is set by the associated CPU. When the read-miss-modify command wins arbitration, duplicate tag store 23 responsively checks its entries to determine if another CPU's cache has an up-to-date copy of the data. If no other CPU has an up-to-date copy, the system control logic retrieves the data from memory 42 and passes it back to the requesting CPU via a fill message. When the victim command portion of the readmiss/victim or read-miss-modify/victim command pair wins arbitration, the data is written back to main memory but a copy remains in the victim data buffer to service pending probe messages. Also, when the victim command wins arbitration, the system control logic employs a buffer clearing mechanism, such as a victim release counter described hereinbelow, to determine when to send a command to the CPU to clear the victim valid bit. The command issued from the system control logic to clear the victim valid bit 82 is referred to as the "release victim valid bit" (RVB) command. Accordingly, the buffer clearing mechanism guarantees that the victim valid bit 82 remains set during the period of time between when the data is transferred to the victim data buffer 78 until all probe messages that were issued from the system control logic prior to the victim command winning arbitration in the system control logic, have had an associated probe response sequence initiated and until a copy of the victim data has been transferred to the system control logic to be written to main memory. Until the victim valid bit 82 is cleared the victim data buffer 78 cannot be de-allocated, and the CPU maintains the status information associated with the data stored in the victim data buffer.

Another flag associated with each of the victim data buffers 78a, is referred to as a "probe valid bit" 84a. The probe valid bit 84a, associated with a victim data buffer, may be set as a probe message is processed by a CPU and prior to the issuance of an associated probe response. If the requested data's address matches an entry in the victim address file 87a, indicating that the requested data is held in a victim data buffer, then the probe valid bit associated with that victim data buffer will be set. When a probe response is issued from the CPU indicating that the data is ready to be accessed, the system control logic 18 will first obtain a copy of the data in the victim data buffer and then issue a "release probe valid bit" command to the CPU to clear the probe valid bit. If another probe message subsequently reaches the top of the probe queue and targets a data block stored in the victim data buffer, then the probe valid bit will again be set. If the probe message at the top of the probe queue targets data stored in a victim data buffer that already has the probe valid bit set, the probe message will not be processed until the bit is cleared, i.e. the probe queue will be stalled.

Figure 6:
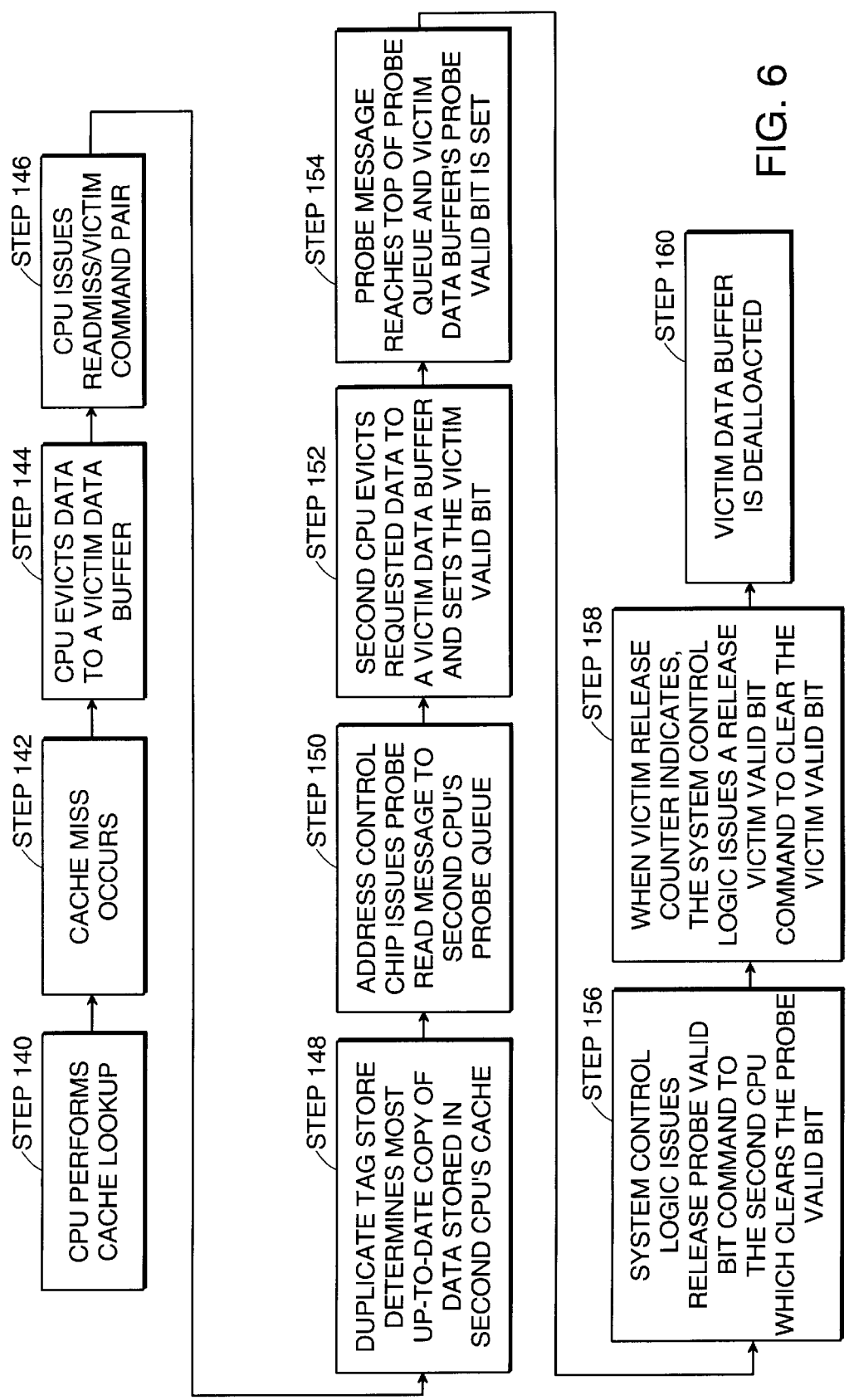
FIG. 6 is a flow diagram of a method for independently deallocating a victim data buffer coupled to a CPU of the computer system of FIG. 1.

For illustration purposes, consider the flow diagram of FIG. 6 wherein a first CPU performs a lookup operation of its cache to access a data element required for an ongoing operation (step 140). A cache miss occurs (step 142) and the CPU determines that another data block is stored in the cache location where the requested data will be placed when it is retrieved. The CPU then evicts the victim data from the cache to a victim data buffer (step 144). The CPU initiates the retrieval of the requested data by issuing a readmiss command and a victim command, i.e. a readmiss/victim command pair (step 146). After the readmiss command wins arbitration, it is issued on Arb bus 21 and duplicate tag store 23 determines that a most up-to-date copy of the data is stored in the a second CPU's cache (step 148). Address control chip 17 responsively issues a probe read message to the second CPU (step 150). The probe read message is placed on the probe queue for that CPU. Before the probe message reaches the top of the probe queue, the second CPU evicts the requested data from the cache into a victim data buffer and sets that buffer's victim valid bit 82a (step 152). When the probe message reaches the top of the probe queue, the CPU compares the target address of the probe message with the entries of the VAF 87a. Upon detecting a match, a probe valid bit 84a associated with the victim data buffer is also set (step 154). If another probe message that targets the same data subsequently reaches the top of the probe queue, it must wait until the probe valid bit is cleared before it can access that data. While the probe bit is set, the victim data can be written back to main memory since a copy of the data will remain in the victim data buffer for the pending probe message to access.

When the system control logic receives the probe response message from the second CPU it obtains a copy of the requested data which it will incorporates in a fill message and returns to the first CPU. The system control logic will also issue a release probe valid bit command to the second CPU that clears the probe valid bit 84a for the victim data buffer (step 156). Further, when the associated victim release counter indicates that all probe messages that were issued before the victim command won arbitration have had a probe response initiated and the victim data has been written back to memory 42, the system control logic issues a release victim valid bit command to clear the victim valid bit 82a (step 158). Therefore using the probe valid bit 84a and the victim valid bit 82a, data can remain in the victim data buffer 78 after the victim data is written back to memory and after the associated victim release counter mechanism indicates that all probes have been compared against the victim data buffers. Only after the probe message accesses the data, and after the victim valid and probe valid bits are cleared, will the buffer be de-allocated (step 160). Such an embodiment allows probe data movement to complete independent of writing victim data back to main memory and independent of performing probe address comparisons.

It should be noted that the independent victim buffer and probe buffer release control invention is not limited to the system configuration depicted in FIG. 1. To the contrary, the present invention applies equally to a variety of system configurations including single processor systems and systems that do not implement a duplicate tag store.

Figure 7:
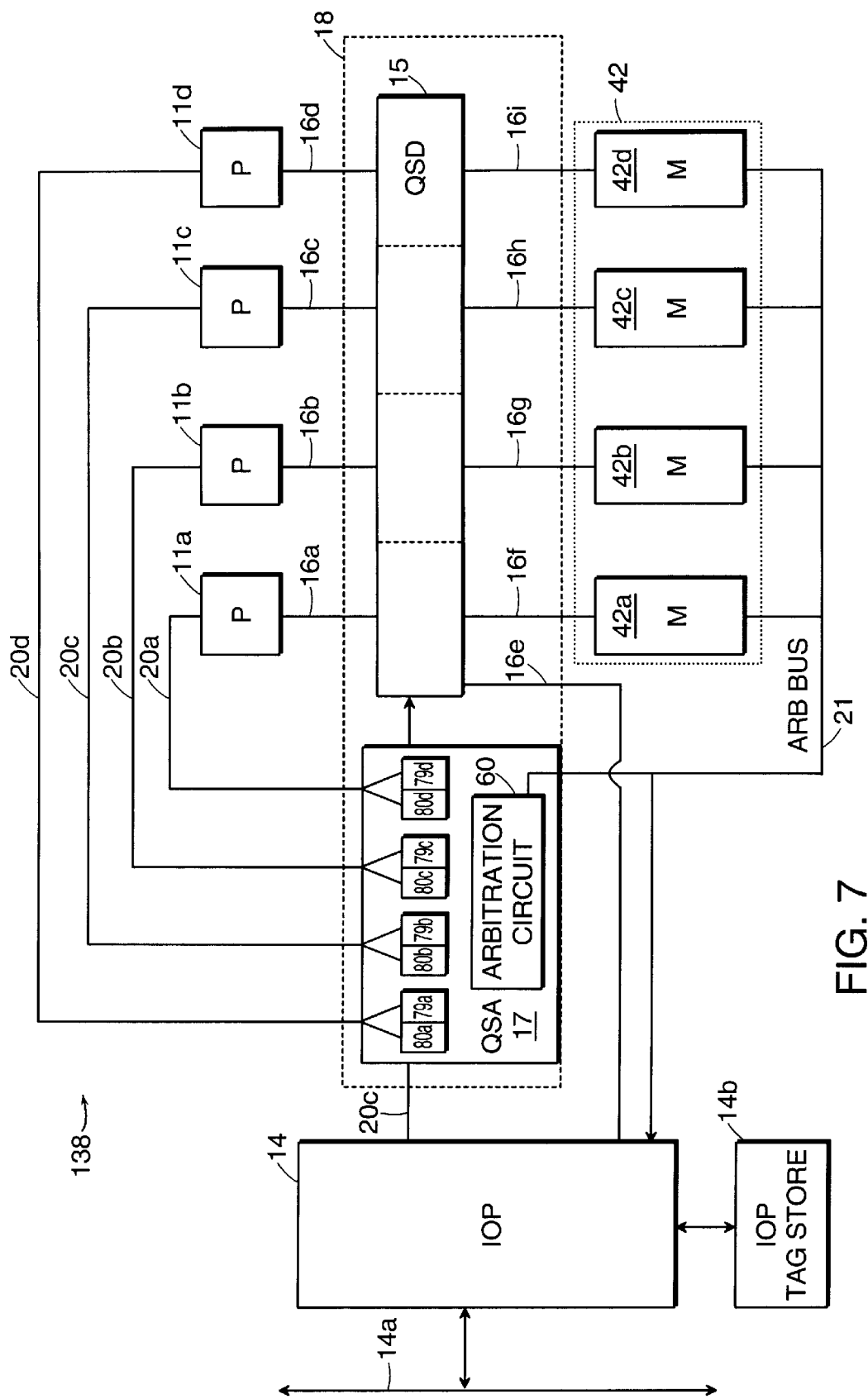
FIG. 7 is a block diagram of a computer system which does not include a duplicate tag store.

For example, consider the multiprocessor computer system 138 of FIG. 7 which includes the same components as multiprocessor computer system 10 (see FIG. 1) except for duplicate tag store. Because multiprocessor computer system 138 does not include a remote duplicate tag store, the system control logic cannot determine whether a given data element is stored in a CPU's cache without actually accessing that cache. Accordingly, in response to each readmiss/victim or read-miss-modify/victim command pair that wins arbitration, each CPU receives a request from the system control logic for the requested data element. In such a system the victim valid bit is set when the victim data element is stored in a victim data buffer. The release victim valid bit command is issued after the victim command associated with the victim data element wins arbitration and that victim data is written into main memory. The probe valid bit operates in the same manner as described above with respect to multiprocessor computer system 10, and the victim data buffer is deallocated when both the probe valid bit and victim valid bit are cleared.

Figure 8:
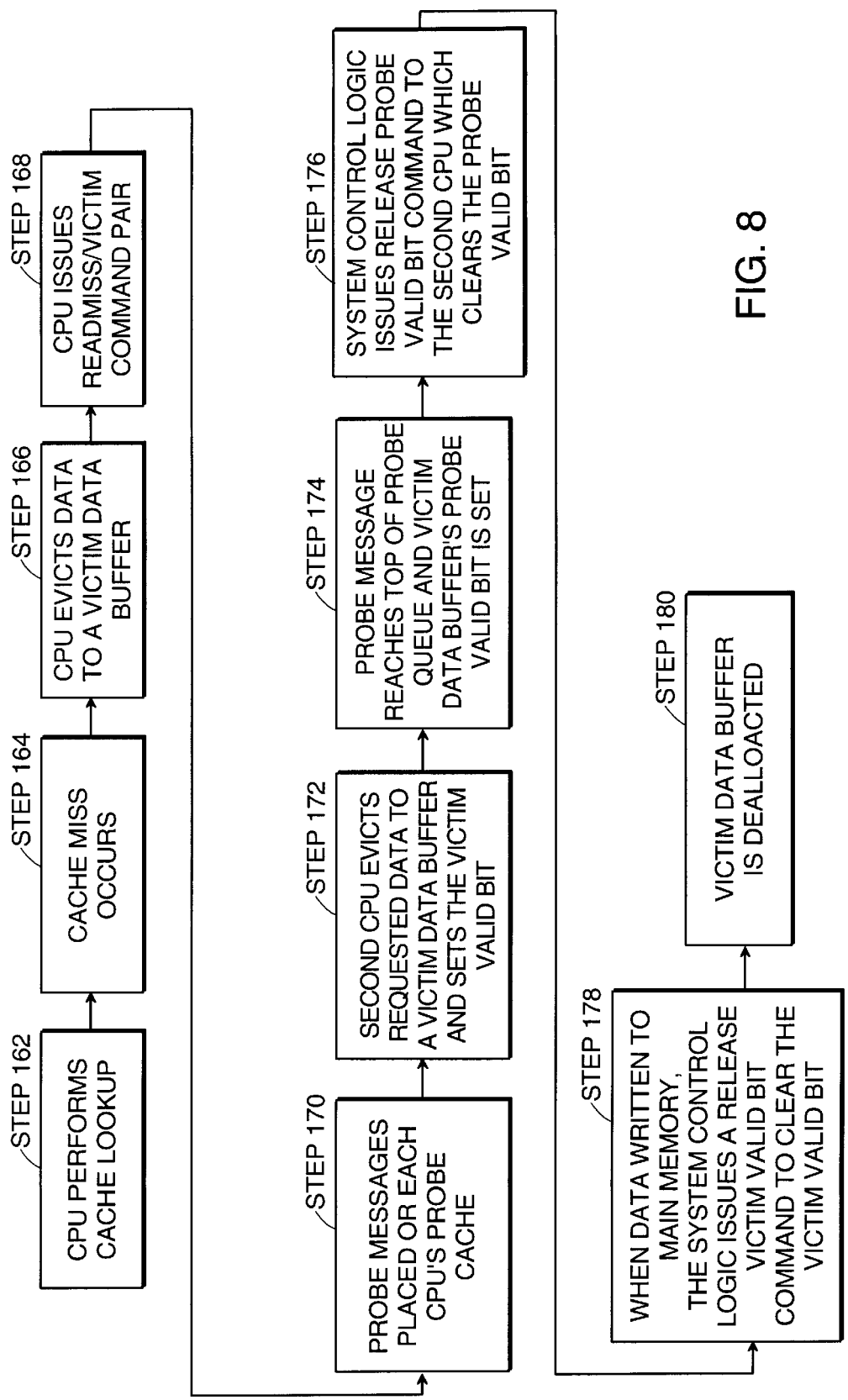
FIG. 8 depicts a flow diagram of a method for independently deallocating a victim data buffer coupled to a CPU of the computer system of FIG. 7.

For example, consider the flow diagram of FIG. 8 which depicts the operation of the victim valid bit and the probe valid bit in multiprocessor computer system 138. Consider that a first CPU performs a lookup operation of its cache to access a data element required for an ongoing operation (step 162). A cache miss occurs (step 164) and the CPU determines that another data block is stored in the cache location where the requested data will be placed when it is retrieved. The first CPU then evicts the victim data from the cache to a victim data buffer (step 166). The first CPU initiates the retrieval of the requested data by issuing a readmiss command and a victim command, i.e. a readmiss/victim command pair (step 168). After the readmiss command wins arbitration, a probe message is placed on the probe queue of each CPU of multiprocessor computer system 138, targeting the requested data element (step 170). Before the probe message reaches the top of the probe queue of a second CPU that has the requested data element stored in its cache, the second CPU evicts the requested data from the cache into a victim data buffer and sets that buffer's victim valid bit 82a (step 172). When the probe message reaches the top of the second CPU's probe queue, the second CPU compares the target address of the probe message with the entries of its VAF 87. Upon detecting a match, a probe valid bit 84 associated with the victim data buffer is also set (step 174). If another probe message that targets the same data subsequently reaches the top of the probe queue, it must wait until the probe valid bit is cleared before it can access that data. While the probe bit is set, the victim data can be written back to main memory since a copy of the data will remain in the victim data buffer for the pending probe message to access.

When the system control logic receives the probe response message from the second CPU, indicating that a copy of the data is ready to be accessed, the system control logic 18 obtains a copy of the requested data which it incorporates in a fill message and returns to the first CPU. The system control logic will also issue a release probe valid bit command to the second CPU that clears the probe valid bit 84 for the victim data buffer (step 176). Further, when the victim data is written into main memory 42, the system control logic issues a release victim valid bit command to clear the victim valid bit 82 (step 178). Only after the probe message accesses the requested data, and after the victim valid and probe valid bits are cleared, will the buffer be de-allocated (step 180). Such an embodiment allows probe data movement to complete independent of writing victim data back to main memory and independent of performing probe address comparisons.

Figure 9:
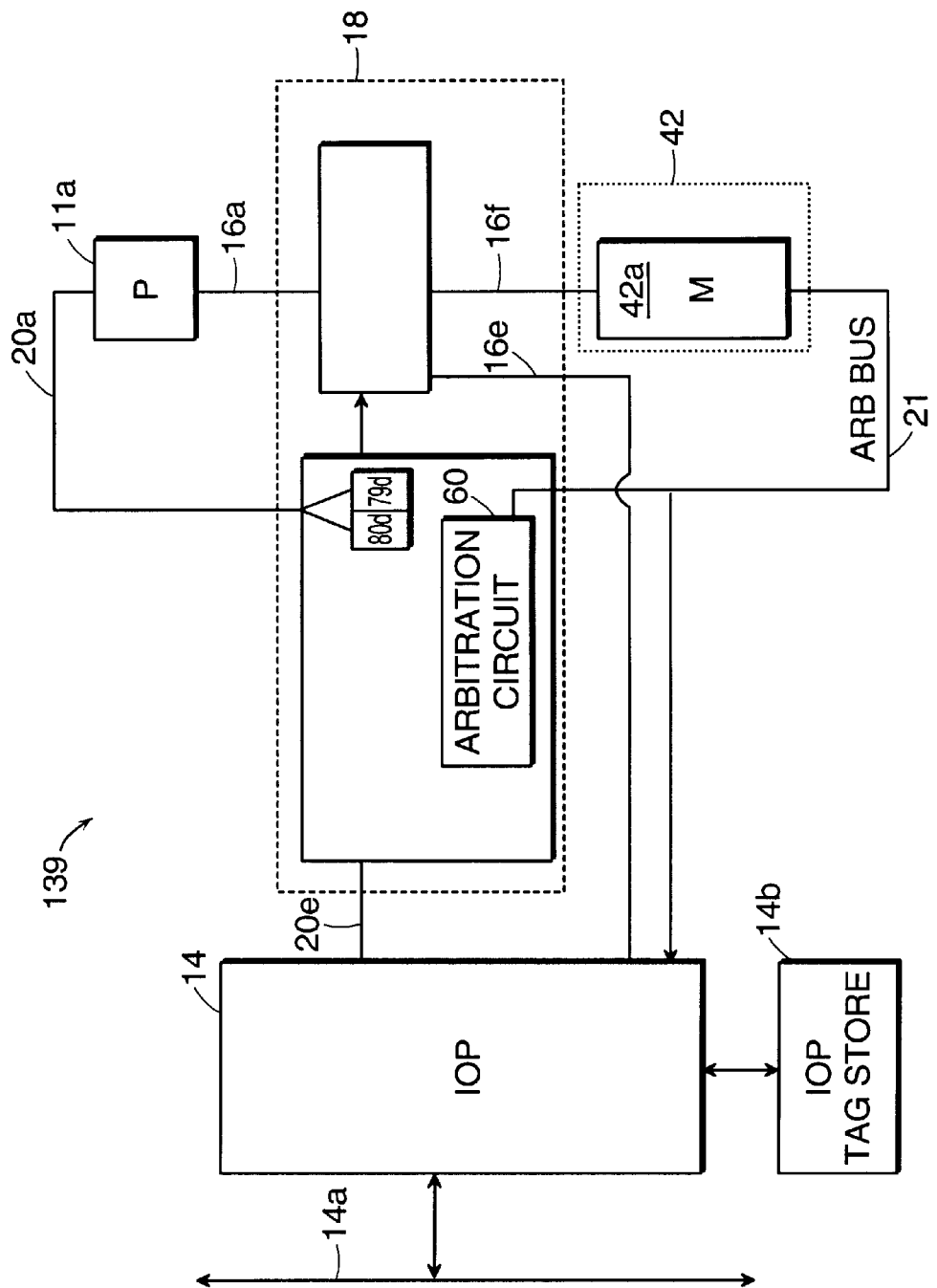
FIG. 9 depicts a single processor computer system which does not implement a duplicate tag store.

A further example of a computer system that does not implement a remote duplicate tag store is a single processor computer system 139 such as shown in FIG. 9. FIG. 9 includes a single processor module 11a similar to that shown in FIG. 2, and an I/O processor (IOP) for transferring data to and from the multiprocessor computer system 10 and external devices. The central processing unit 11a and the IOP are coupled to system control logic 182 which provides a data interconnect to main memory 42. In such a system the victim valid bit is set when a victim data element is stored in a victim data buffer. The release victim valid bit command is issued after the victim command associated with the victim data element wins arbitration and that victim data is written into main memory. The probe valid bit operates in the same manner as described above with respect to multiprocessor computer system 10, and the victim data buffer is deallocated when both the probe valid bit and victim valid bit are cleared.

III. Separate Probe and Victim Buffer Read and Release Control

As previously mentioned, when data is transferred from cache to its associated CPU's victim data buffer and its address transferred to the victim address file, that copy of the victim data can be kept in the victim data buffer after the victim has been written back to main memory. This allows the system to service any outstanding probe messages that target the victimized block from the CPU's victim data buffer.

Prior art CPUs have typically stored data in their victim data buffers only until victim data has been transferred to the system control logic 18 or main memory 42. To service outstanding probes many prior art systems implement a duplicate copy of the victim data buffers in the system control logic. Such a solution is overly complex and requires unnecessary redundancy. The present invention allows, by means of a scheme for allowing a copy of victim data to remain in a victim data buffer after another copy has been read from it, probes to be serviced using the victim data buffers that are present in each CPU in multiprocessor computer system 10.

The implementation of a victim valid bit associated with each victim data buffer, provides one method for allowing the buffer to remain allocated after data has been read from it. For example, referring now to the flow diagram of FIG. 10A, when a data element is evicted from cache (step 122) the associated CPU allocates a victim data buffer (step 123) to store that victim data. The CPU transfers the victim data to the victim data buffer (step 124) and sets the associated victim valid bit (step 125). A readmiss/victim or read-miss-modify/victim command pair is subsequently issued to the system control logic 18 and input to arbitration circuit 60 (Step 126). Upon winning arbitration, the victim command will cause the data stored in the victim data buffer to be written to main memory (Step 127). After issuance of a release victim valid bit command from the system control logic, the victim valid bit is cleared and the buffer subsequently deallocated (step 128). The release victim valid bit command is issued when some number of probe messages that have passed the serialization point of the computer system prior to the associated victim command have searched the victim data buffers for the data element they require and, if necessary, obtained a copy of the data element. Accordingly, the present invention allows the data read operation to operate independently from the victim data buffer release operation by causing the victim data buffer to remain allocated, and the central processing unit to maintain the data's coherency information, until the victim valid bit is cleared even though the victim data was written to main memory when the victim command passed the serialization point.

Referring now to FIG. 10B, a flow diagram depicts the operation of a further embodiment of the present invention in a computer system that does not include a duplicate tag store remote from the central processing units. In such a system the victim data buffer is deallocated at a point in time that is based on a current operating state of the system. For example, consider a data element that is stored in a victim data buffer having the associated victim valid bit set (Step 130). In computer systems that do not have a remote duplicate tag store, the system control logic cannot determine whether a given data element is stored in a CPU's cache without actually accessing that cache. Accordingly, in response to each readmiss/victim or read-miss-modify/victim command pair that wins arbitration (Step 132), each CPU receives a request from the system control logic (Step 134). In such a system the release victim valid bit command is issued, and the victim valid bit cleared, after the victim command wins arbitration and the victim data is written into main memory (Step 136). Accordingly, the copy of the victim data stored in the victim data buffer remains accessible by pending requests until the main memory write operation is in the process of executing. The coherency state is maintained by the CPU until the data is in main memory 42. Accordingly, there is no need for coherency maintenance logic in any of the parts of the system control logic 18 which the victim data passes through on the way to main memory.

It should be noted that a further example of a computer system that does not implement a remote duplicate tag store and is capable of supporting the invention is single processor computer system 139 such as shown in FIG. 9. As previously stated FIG. 9 includes a single processor module 11a similar to that shown in FIG. 2, and an I/O processor (IOP) for transferring data to and from the multiprocessor computer system 10 and external devices. The central processing unit 11a and the IOP are coupled to system control logic 182 which provides a data interconnect to main memory 42. In such a system the victim valid bit is set when a victim data element is stored in a victim data buffer. The release victim valid bit command is issued after the victim command associated with the victim data element wins arbitration and that victim data is written into main memory.

IV. 96-0155 Victim Release Counters

Referring now to FIG. 11, processor module 11a of multi-processor computer system 10 is shown coupled to address control chip 17. Address control chip 17 is shown to further include counter logic referred to as victim release counters 222a and a probe counter 220a. As previously described, processor module 11a includes an internal probe queue 81a, a miss-address file (MAF) 86a for storing copies of outstanding commands that CPU 12a has issued to the system but have not yet completed, and a victim address file (VAF) 87 that stores a copy of the address of each victim data element that has been placed in a victim data buffer 78a. Address control chip 17 is shown to include a separate probe queue 79a and fill queue 80a associated with CPU 12a coupled thereto. Accordingly, if multiprocessor computer system 10 includes four processor modules, address control chip 17 should include four pairs of probe and fill queues, one victim release counter for each victim data buffer, and one probe counter for each probe queue, as will be shown with respect to FIG. 12.

As previously stated, when a CPU decides to store a requested data element in the same location as a data element that is already stored in cache, the stored data block is evicted from that cache. The evicted data block is placed into a victim data buffer 77a and the associated victim valid bit 84 is set. The CPU subsequently issues a victim command and a readmiss command (a readmiss/victim command pair) to the system control logic 18 to retrieve the requested data and write the victim data to main memory 42. When the victim command wins arbitration, the duplicate tag store 23 entry that corresponds to the victim data is updated to indicate that the central processing unit that evicted it is no longer the owner of that data.

A problem arises when a first CPU issues a readmiss/victim command pair targeting a specified data element while, concurrently, another CPU issues a readmiss command for that same data element. If the readmiss command wins arbitration before the readmiss/victim command pair, the duplicate tag store lookup associated with the readmiss command will indicate that the most up-to-date copy of the data requested by the second CPU is stored in the first CPU's cache. However, by the time that the probe read message reaches the top of the first CPU's probe queue, the victim data buffer has been deallocated. Therefore, when the probe read message reaches the top of the probe queue, the data is no longer stored in the victim data buffer and cannot be accessed therefrom.

In the present invention, the address control chip 17 includes a number of probe counters 220a–220d and a plurality of victim release counters 222a–222d (only those associated with CPU module 11a are shown) for solving the abovementioned problem. Each probe counter 220a–220d is associated with a single probe queue 79a–79d. Each probe counter counts the number of probe messages that have passed the serialization point of the system (i.e. the output of arbitration circuit 60) and that have been placed on the appropriate probe queues, but have yet to receive a probe response message. Each of the victim release counters 222a is associated with a single victim data buffer. Each victim release counter includes logic for parallel loading a snapshot copy of a count value, from the associated probe counter, when a victim command that targets the data stored in the associated victim data buffer wins arbitration. Each victim release counter further includes logic for decrementing the parallel loaded count value by a preselected value, typically one, every time the associated CPU performs an address comparison. A CPU performs an address comparison by comparing of the target address of a probe message which is at the top of the associate probe queue, against the addresses of the victim data elements stored in that CPU's victim data buffers. The address comparison is performed to determine if the data requested by the probe message is stored therein.

The method of the present invention provides that each probe counter 220a–220d retains a running count of the number of probe messages stored on the probe queue of the associated CPU 12a–12d. When a given CPU requests a specified data element and decides to write a particular victim data block back to main memory 42, it issues a readmiss/victim command pair. When the victim command portion of the readmiss/victim command pair wins arbitration, the reference to the victim data block is removed from the duplicate tag store 23 and the data is written into main memory. Since probe messages are only issued to a CPU associated with a tag address in the duplicate tag store 23 that matches the requested data, no further probe messages will be issued to the CPU for the victim data block. However, a copy of the victim data remains in the victim data buffer. The victim data buffer will not be deallocated until all of the probe messages that were pending on the probe queue 79 when the victim command won arbitration have had an associated address comparison performed.

For example, consider CPU 11a, probe queue 79a, probe counter 220a, and the associated victim release counters 222a. When a victim command wins arbitration, an individual victim release counter 224a, associated with the specified victim data buffer storing the victim data, parallel loads a snapshot copy of the count value from probe counter 220a. Thereafter, the victim release counter 224a decrements the snapshot copy each time that an address comparison is performed by CPU 12a, regardless of the target address of the associated probe message. As specified above, when a victim command wins arbitration, the tag of the targeted data is removed from duplicate tag store 23 and no further probe messages will be issued to the associated CPU for that data. Therefore, when the victim release counter 224a reaches the value of zero, it indicates that every probe message that potentially targeted the specified data block and that has passed the serialization point of the system when the victim command won arbitration, has had an address comparison performed.

In the preferred embodiment, a victim valid bit 82a and a probe valid bit 84a are associated with each victim data buffer. When the victim release counter 224a reaches zero the victim valid bit is responsively cleared. When the probe bit is also cleared, indicating that the data requested by a probe message at the top of the probe queue has been transferred to the requesting CPU, the victim data buffer can be deallocated.

Figure 12:
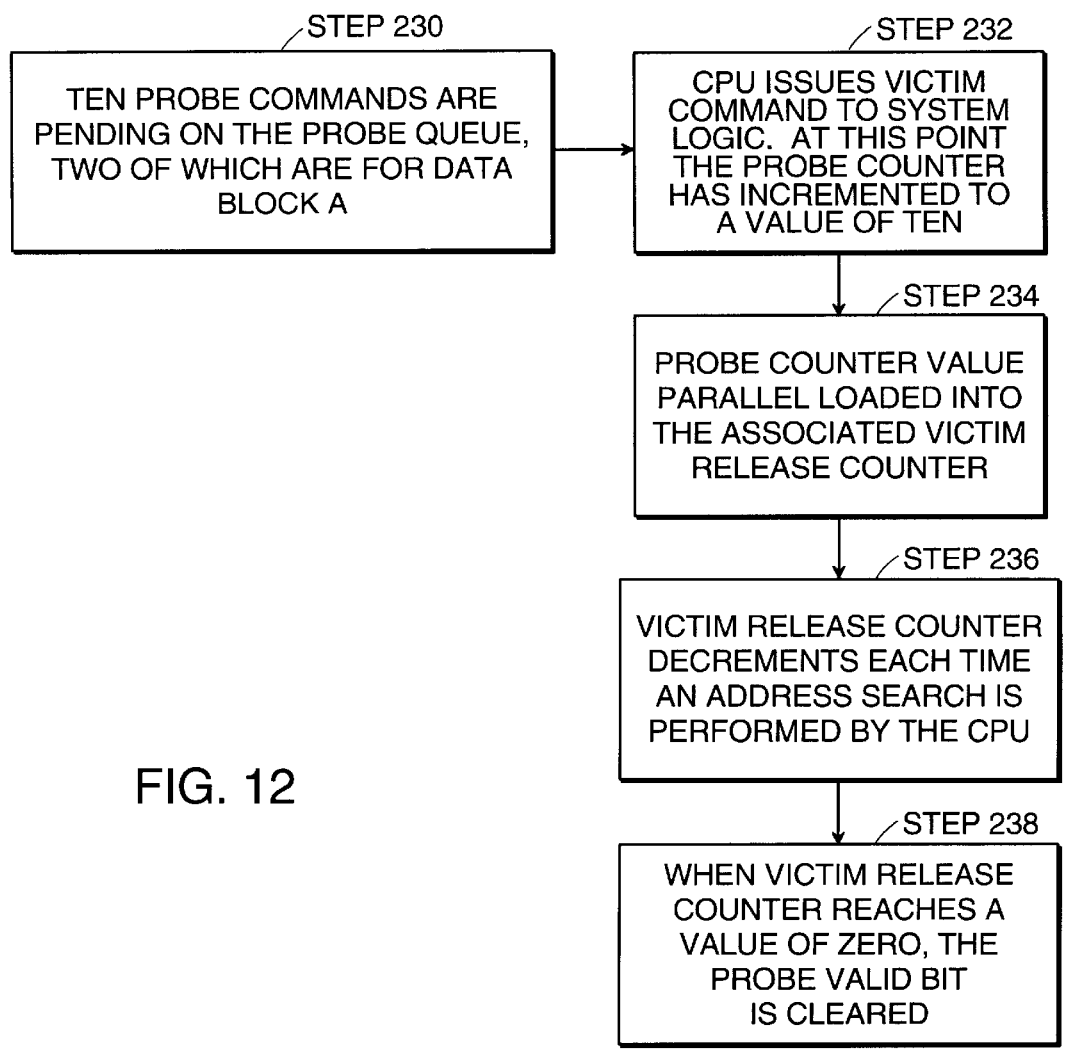
FIG. 12 depicts a flow diagram of the operation of the probe counter and the victim release counters of FIG. 11.

Referring now to FIG. 12, a flow diagram depicts the operation of the victim release counters. For illustration purposes, consider that a given probe read message is the third of ten probe messages stored on probe queue 79a, two of which target data block A stored in cache memory 29 (step 230). When the CPU determines that data block A should be written back to memory 42, typically when it is to be evicted from cache 29 to make room for a requested data element, the CPU issues a readmiss/victim command pair to the system control logic. The readmiss/victim command pair is input to arbitration circuit 60. Because probe counter 220a has counted the number of probe messages pending on probe queue 79a, it will identify ten pending probe messages (step 232).

When the victim command wins arbitration, the value of the probe counter is parallel loaded into the victim release counter 224a associated with the victim data buffer 77a (step 234). Therefore, the value ten is stored in victim release counter 224a. As the probe messages on probe queue 79a progress, every time CPU 12a performs an address comparison it responsively sends a probe response to the address control chip 17a and to the victim release counter 224a. The probe response is used by the victim release counters to decrement the stored value by a preselected value, typically being one. When the victim release counter 224a reaches zero, the victim valid bit 82a is cleared. Therefore, every time a probe response is sent to the address control chip 17a, the victim release counter 224a will decrement its value beginning from 10 (step 236). When the victim release counter 224a reaches zero, every probe message that was pending when the victim command won arbitration, has had an address comparison performed. Since a copy of the data block was stored in victim data buffer 77a, each probe message could access the data as required, without causing probe queue 79a to stall. Accordingly, data block A is accessed by two of the ten probe messages that were issued to CPU 12a before the time when the associated entry in the duplicate tag store 23 was removed. Thereafter the victim valid bit is cleared (step 238) and the victim data buffer can be deallocated without adverse impact to the system's performance.

IV. Victimization of Clean Data Blocks

Figure 13:
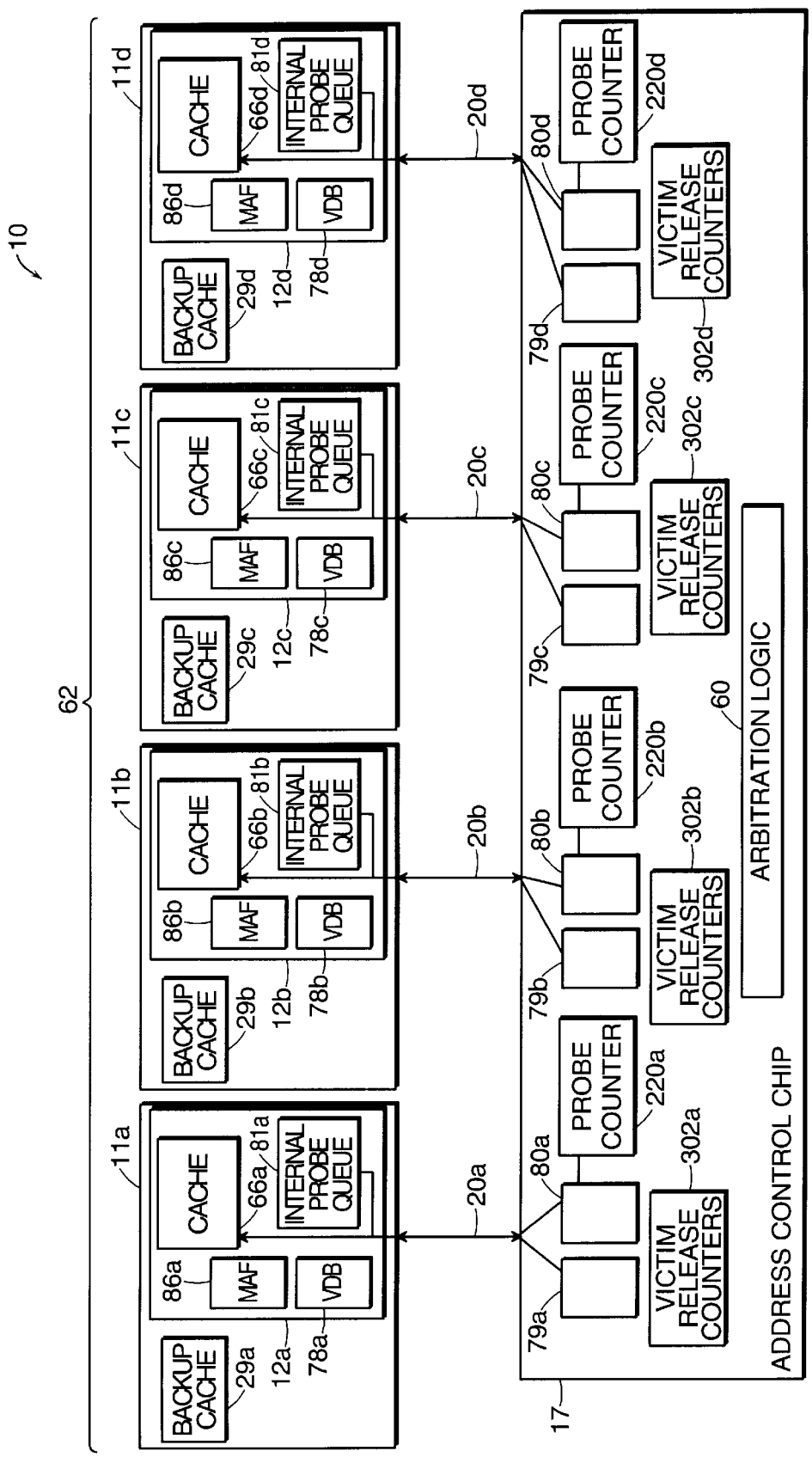
FIG. 13 depicts a block diagram of several central processing units of the computer system of FIG. 1 together with probe counters and victim release counters associated with those CPUs and included in the address control chip.

Referring now to FIG. 13, multiprocessor computer system 10 is shown to include a plurality of processor modules 11a–11d (each similar to the processor module of FIG. 11 but depicted in a simplified form), coupled to address control chip 17. Address control chip 17 is shown to include probe counters 220a–220d and victim release counters 302a–302d associated with the plurality of victim data buffers 78a–78d of the CPUs 12a–12d. Processor modules 11a–11d are shown coupled to address control chip 17 via the associated probe queues 79a–79d and fill queues 80a–80d.

As previously stated, the fill queues and probe queues associated with a given CPU operate independently from each other and are processed at different rates by the associated CPU. As such, it is possible for a probe message in a CPU's probe queue to be processed by the CPU after a fill message from the CPU's fill queue that was generated by a command that issued to the system serialization point later than the command that generated the probe.

In such a computer system it is possible that a first CPU issues a readmiss/victim command pair to the system control logic that victimizes a given data element, concurrently with a command from a second CPU that references that same data element. A problem arises in such a situation when both a first and second CPU have unmodified, nonexclusive copies of a first data element stored in their caches. Consider that the first CPU issues a change-to-dirty command targeting the first data element. Issuance of the change-to-dirty command, a command used to change an unmodified data block to the exclusive modified state, will cause the system control logic to place a probe invalidate message on the second CPU's probe queue. If the second CPU issues a read-miss command that targets a second data element, which displaces the first data element and which is issued to the system serialization point after the change-to-dirty command from the first CPU, a fill message containing the second data element will be placed on the second CPU's fill queue. A copy of the displaced data will not be retained since the data need not be written back to memory. The fill message on the second CPU's fill queue may bypass the probe invalidate in the second CPU's probe queue. In such a case, since there is no victim data buffer prohibiting the issuance of further references to either data element, the second CPU may issue a read-miss-modify command that re-fetches the first data element and displaces the second data element. That read-miss-modify command must be issued to the system serialization point subsequent to the change-to-dirty from the first CPU. It will generate a second fill message targeting the first data element on the second CPU's fill queue. This second fill message may also bypass the probe invalidate message on the second CPU's probe queue, creating an exclusive, modified copy of the first data element in the second CPU's cache. If this copy of the first data element is not displaced from the second CPU's cache before the probe invalidate in the second CPU's probe queue is processed by the second CPU, then the invalidate will erroneously invalidate the only up-to-date copy of the first data element.

In the circumstances described above, such a problem can be solved when the second CPU stores the first, clean data element in a victim data buffer before it issues the readmiss command for the second data element. Further, when an unmodified or clean data element is stored in a victim data buffer, a "clean-victim" command is issued with the readmiss or readmiss modify command. When the clean-victim command wins arbitration in the system control logic, the duplicate tag store entries are updated to indicate that the clean victim data stored in the victim data buffer is no longer stored in the second CPU's cache. Since each CPU in multiprocessor computer system 10 possesses logic that prevents issuance of a readmiss or read-miss-modify command for a data element stored in a victim data buffer, the second CPU cannot issue the subsequent read-miss-modify command targeting the first data element. The victim data buffer storing the clean data block will not be deallocated until all pending probes access the data stored therein and therefore the probe invalidate message invalidates the intended version of the first data element.

Figure 14:
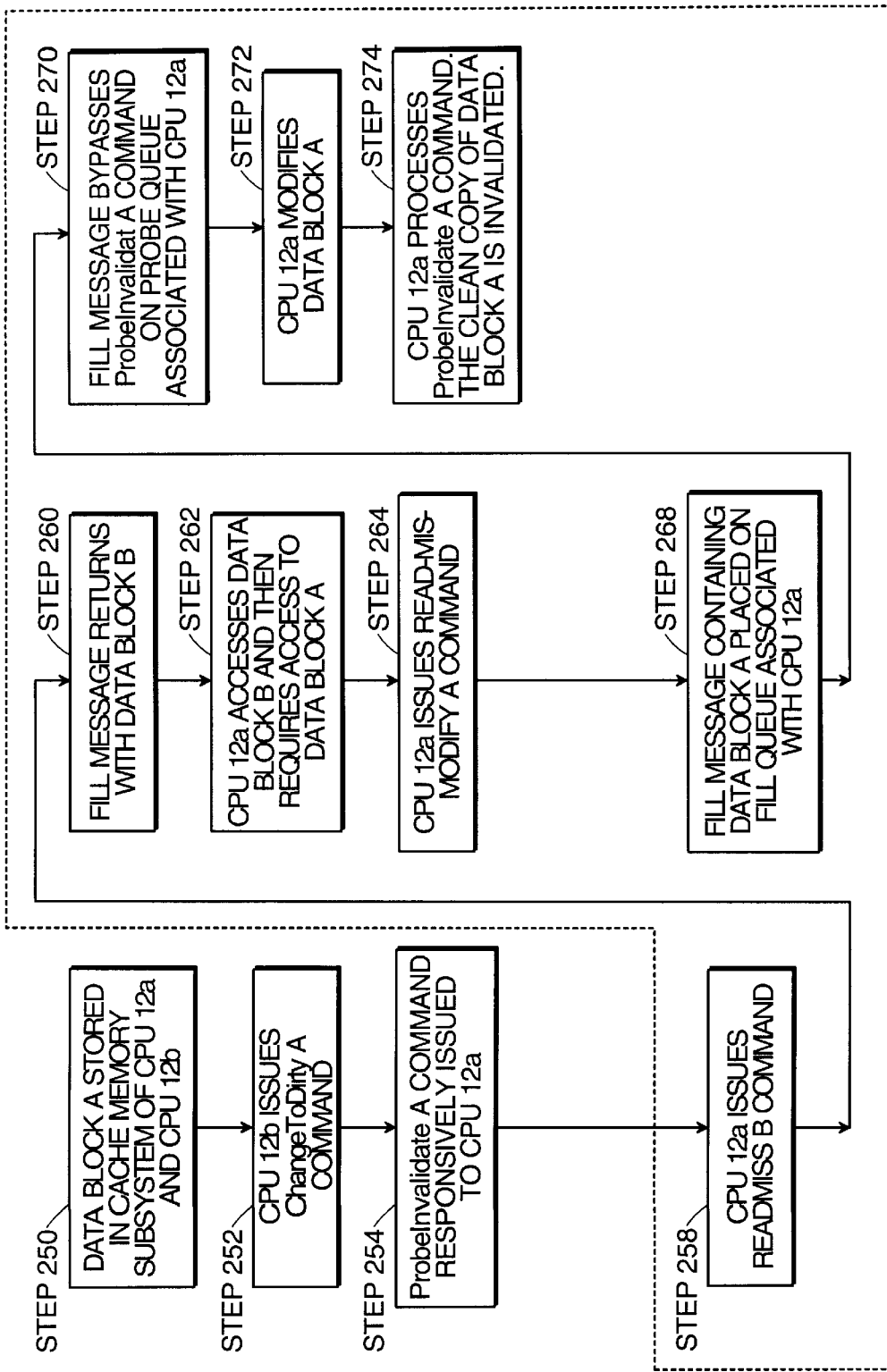
FIG. 14 depicts a flow diagram illustrating a problem solved by clean-victim commands executed on the computer system of FIG. 1.

Referring to FIG. 14, a flow diagram more specifically depicts the aforementioned problem. For example, consider that a clean, nonexclusive copy of data block A is stored in the cache memory of CPU 12*a* (step 250). Because the status of the data is clean and nonexclusive, it is not the only copy of this data in the system and therefore does not have to be written back to main memory 42 when it is displaced from its location in cache memory. Furthermore, consider that another CPU 12*b*, also has a clean, nonexclusive copy of data block A and wants to modify it (step 250). When CPU 12*b* wants to modify its copy of a valid data block, it issues a change-to-dirty (CTD) command to the system control logic (step 252). A change-to-dirty command is executed by the system control logic only if the data block in CPU 12*b*'s cache is an up-to-date version. The change to dirty command results in the status of the data element being changed to the exclusive modified state(i.e. most up-to-date version in the system). Accordingly, if another CPU also has an up-to-date copy of the data block in its cache when the change-to-dirty command is issued, the command will cause that copy to be invalidated. Therefore, when the change-to-dirty command wins arbitration and is issued to the system serialization point, the address control chip 17 issues a probe invalidate message to CPU 12*a* via probe queue 80*a* (step 254). Thereafter, CPU 12*b* can modify its copy of the data by issuing a read-miss-modify command to the system control logic.

The probe invalidate A message that was issued by the address control chip 17 to CPU 12*a* progresses through probe queue 80*a*. Before, the probe invalidate message reaches the top of the probe queue 80*a*, CPU 12*a* requires access to data block B, whose address maps to the same location in cache as data block A. Therefore, CPU 12*a* checks its cache memory and, upon determining that the data is not stored therein, evicts data block A to a victim data buffer and issues a readmiss B command to the system control logic 18 to retrieve data block B (step 258). When the readmiss B command wins arbitration, the system control logic checks the duplicate tag store 23 entries to determine if any other CPU has a most up-to-date version of the data. Duplicate tag store 23 indicates that no other CPU has an up-to-date copy of data block B and therefore it must be retrieved from main memory 42. When the associated fill message returns to CPU 12*a* from main memory 42 with the requested data, it moves through the fill queue 79*a*. The fill message reaches the top of the fill queue 79*a* before the probe invalidate message reaches the top of the probe queue 80*a* and fills the cache location with data block B (step 260).

CPU 12*a* completes its use of data block B and again requires data block A for a subsequent operation (step 262). Therefore, CPU 12*a* checks its cache memory for data block A and upon a cache miss, evicts data block B and issues a read-miss-modify A command to the system control logic 18 (step 264). When the read-miss-modify A command wins arbitration, the duplicate tag store 23 indicates that no other CPU has an up-to-date copy of data block A and therefore it must be retrieved from memory. Accordingly, a fill A command is sent back to CPU 12*a* which enters the fill queue 80*a* (step 268) and passes the probe invalidate A command which is pending on probe queue 80*b* (step 270). When data block A is stopped in cache, CPU 12*a* modifies data block A making it the most up-to-date version of the data (step 272). Subsequently, the probe invalidate A command reaches the top of the probe queue, and invalidates the most up-to-date copy of data block A (step 274). Accordingly, the only existing copy of modified data block A is incorrectly invalidated.

Figure 15:
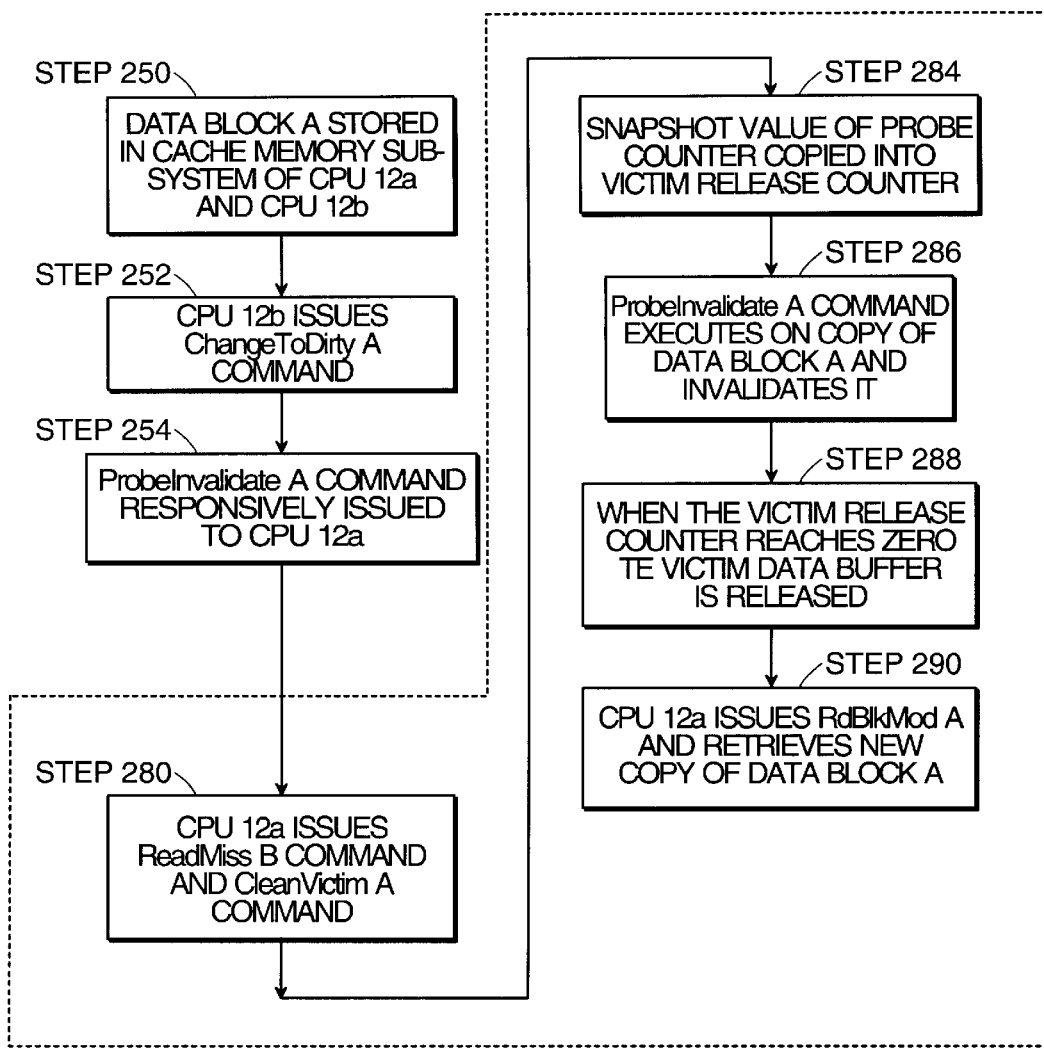
FIG. 15 depicts a flow diagram of the operation of clean-victim victim commands executed on the computer system of FIG. 1.

Referring now to FIG. 15, a flow diagram depicts the operation of clean-victim commands which can be used to prevent the most up-to-date version of a data block from being modified until after an associated probe invalidate command is processed. Considering the situation depicted above, the method of the present invention provides that when the readmiss command for data block B is issued, CPU 12 should also store data block A in a victim data buffer. Because the CPU possesses the characteristic that it will not issue a readmiss or read-miss-modify command for a data element stored in a victim data buffer, and because the victim data buffer storing clean data block A will not be deallocated until all pending probe messages, including the probe invalidate A command, are processed, the inadvertent invalidation of data block A is prevented. This is different than typical system operation because normally only dirty data blocks are placed into a victim data buffer 78. Now, because clean data block A has been placed into a victim data buffer 78, the CPU will not issue any further commands to retrieve another copy of it until the victim data buffer 78 is released. Therefore, the clean-victim command will prevent CPU 12 from issuing the read-miss-modify command for data block A until the associated victim data buffer 78 is deallocated. This will not happen until CPU 12 writes the copy of data block A, that is stored in the victim data buffer, back to main memory 42 and all probes that target data block A, have passed through the probe queue.

Accordingly, before a readmiss or read-miss-modify command is issued to the system control logic for a data block that will displace a clean data block stored in cache, the CPU will store the clean data block in a victim data buffer. When the readmiss command is issued, the CPU will also issue a clean-victim command (step 280). When the clean-victim command wins arbitration, the system copies the value of the associated probe counter into the associated victim release counter for the specified victim data buffer (step 284). After the probe invalidate message has executed and the victim release counter decrements to a count of zero (step 286), the victim data buffer storing the clean victim data block can be de-allocated (step 288). After the victim data buffer is deallocated, the CPU can issue the read-miss-modify A command to retrieve a copy of data block A and modify it (step 290).

Therefore the probe invalidate message operates on the clean version of data block A and the problem is solved. Accordingly, by applying clean-victim commands to the victim release counter invention, the dual-queue model can allow fill messages to pass probe invalidate messages without the problem of invalidating a clean copy of a given data block.

Figure 16:
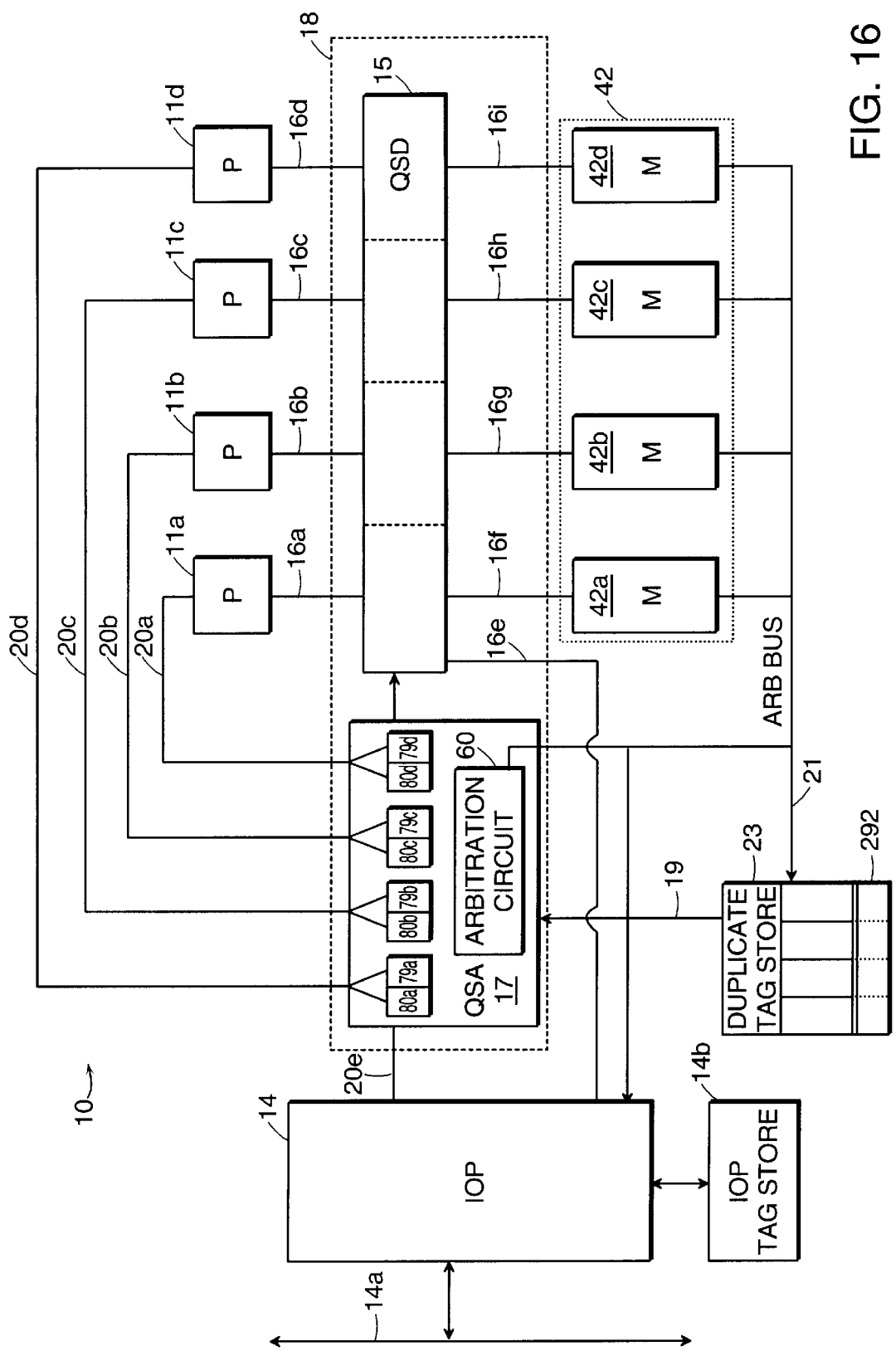
FIG. 16 depicts a further enhancement to the operation of clean-victim commands as implemented on one of the central processing units of the computer system of FIG. 1.
Figure 17:
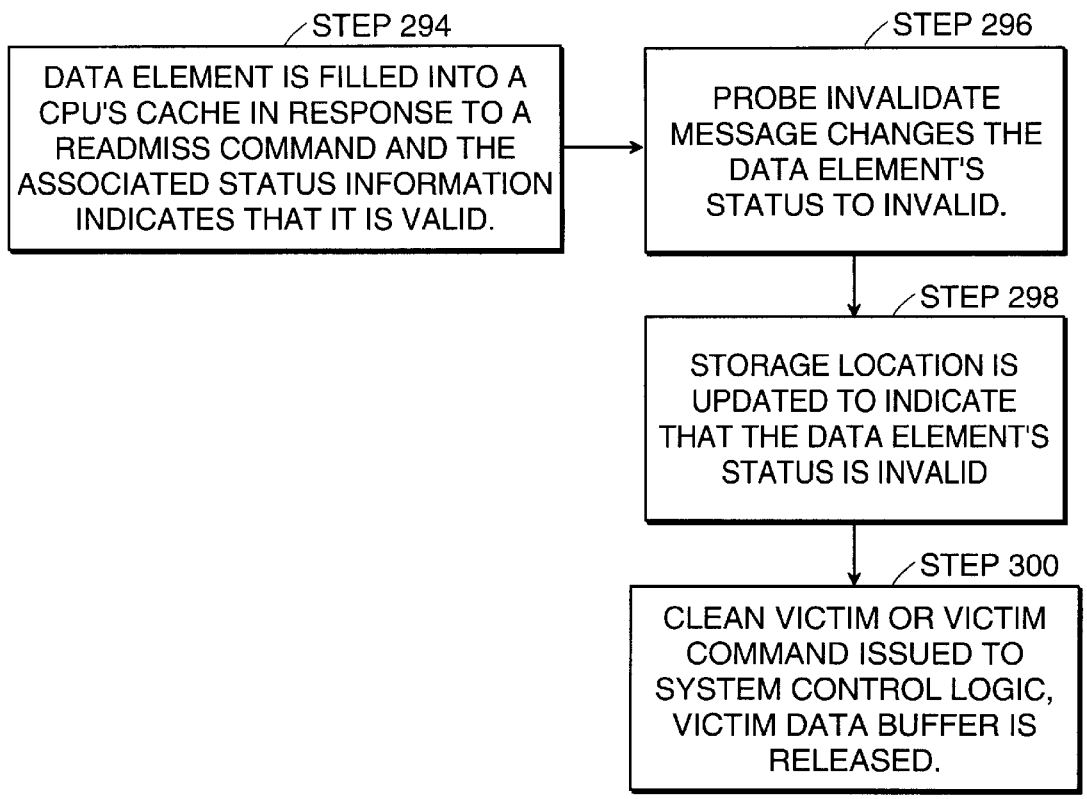
FIG. 17 depicts a flow diagram of the enhancement to the operation of clean-victim commands as implemented on one of the central processing units of the computer system of FIG. 1.

Referring now to FIG. 16, an optimization to both the victim release counter invention and the clean victim invention is shown wherein a storage location 292, associated with each entry of duplicate tag store 23, indicates that a cache location has or has not been, the target of a previous probe message. For example, referring now to FIG. 17, when a data element is filled into a CPU's cache in response to a readmiss command, it's status information usually indicates that the data element is valid (Step 294). The data element's status information can only be changed to invalid if a probe invalidate message has passed through the CPU's is probe queue and accessed the data (Step 296). Therefore, the storage location can indicate whether the data element is valid or invalid. If the storage location indicates that the data element is invalid, a probe invalidate command has previously accessed it (Step 298). Thereafter, if a clean-victim command or a victim command is issued to the system logic and the bit in the duplicate tag store entry indicates that the cache entry has been the target of a probe message, then the value of the probe counter does not have to be stored in the victim release counter storing the data block. Rather, the victim data buffer is released immediately (Step 300) and therefore avoids the overhead associated with maintaining the victim release counter.

Having described a preferred embodiment of the invention, it will now become apparent to one of ordinary skill in the art that other embodiments incorporating its concepts may be used. It is felt, therefore, that this embodiment should not be limited to the disclosed embodiment, but rather should be limited only by the spirit and scope of the appended claims.

What is claimed is:

1. A method for distributing data dependency stalls in a multiprocessor computer system including a first one of a plurality of central processing units, said method comprising the steps of:

a) maintaining a plurality of entries in a miss address file coupled to said first central processing unit, each of said entries associated with each of a first set of commands issued by said first central processing unit;

b) stalling a first one of a set of probe messages, stored in a probe queue coupled to said first central processing unit, responsive to one of said plurality of entries in said miss address file associated with a data element targeted by said probe message;

c) restarting said first one of said set of probe messages responsive to a change in said one of said entries in said miss address file associated with said data element targeted by said probe message;

d) monitoring a state of each of a plurality of probe queues, each individual one of said plurality of probe queues coupled to different ones of said plurality of central processing units, said state indicating whether each of said plurality of probe queues is stalled; and e) stalling a central arbitration circuit, coupled to said first central processing unit, responsive to said state of said plurality of probe queues.

2. The method of claim 1 wherein said first set of commands includes all commands issued by said first central processing unit.

3. The method of claim 1 wherein said first set of commands comprises read-miss and read-miss-modify commands issued by said first central processing unit.

4. The method of claim 1 wherein said first one of said set of probe messages has been stored in said probe queue for a time greater than all other probe messages stored in said probe queue.

5. The method of claim 4 wherein said first one of said set of probe messages is one of said set of probe messages that is at a top of said probe queue.

6. The method of claim 1 wherein each of said plurality of entries in said miss address file indicates one of two states, said states comprising a first state wherein said one of said set of probe messages has been issued by said first central processing unit to a system control logic coupled to said first central processing unit but has not received a response from said system control logic, and said states comprising a second state wherein said one of said set of probe messages has been issued to said system control logic and has received a response from said system control logic.

7. The method of claim 6 wherein said one of said set of probe messages is in said first state when said first central processing unit stores a copy of said one of said set of probe messages into said miss address file and issues a copy of said one of said set of probe messages to the system control logic.

8. The method of claim 7 wherein said one of said set of probe messages transitions from said first state to said second state when said system control logic returns a response to said first central processing unit.

9. The method of claim 8 wherein said response is a fill message, said fill message returning a copy of said data element targeted by said one of said set of probe messages.

10. The method of claim 9 wherein said system control logic further comprises a plurality of fill queues, each of said fill queues associated with one of said plurality of central processing units, and wherein each of said fill queues delivers a fill message to its associated central processing unit.

11. The method of claim 10 wherein said plurality of fill queues delivers said fill message independent of said associated central processing unit processing said set of probe messages.

12. The method of claim 6 wherein the step of stalling one of said set of probe messages comprises the steps of:

A) identifying a first set of said miss address file entries by a comparison of an address, associated with said one of said set of probe messages, against each of said entries of said miss address file, and wherein said first set may contain no entries;

B) identifying a second set of said miss address file entries, said second set comprising all entries in said first set of miss address file entries whose commands are in said first state, wherein said second set may contain no entries;

C) stalling said one of said set of probe messages when said second set of miss address file entries contains one or more entries.

13. The method of claim 12 wherein said second set of said miss address file entries may contain one entry.

14. The method of claim 12 wherein said one of said set of probe messages has been stored in said probe queue for a time greater than all other probe messages stored in said probe queue.

15. The method of claim 14 wherein said one of said set of probe messages is one of said probe messages that is at a top of said probe queue.

16. The method of claim 15 wherein all of said probe messages pending on said probe queue are stalled responsive to the stalling of said one of said probe messages that is at said top of said probe queue.

17. The method of claim 12 wherein the step of restarting said first one of said set of probe messages is responsive to a change in state of one of said second set of miss address file entries from said first state to said second state.

18. The method of claim 1 wherein said system control logic further comprises a serialization point responsive to said central arbitration circuit.

19. The method of claim 18 which further comprises the steps of:

issuing commands from each of said plurality of central processing units to said central arbitration circuit and said arbitration circuit issuing said commands to said serialization point in a pipelined manner; and processing said commands issued to said serialization point such that a probe message may be issued to one of said plurality of central processing unit's probe queue before said one of said plurality of central processing units has received a copy of said data element in a fill message reply from the system control logic.

20. The method of claim 19 wherein said system control logic is further coupled to a duplicate tag store.

21. The method of claim 1 wherein said probe queue can be in one of two states, said states comprising a first state wherein said probe queue may have additional probe messages stored thereon and said states comprising a second state wherein said probe queue may not have additional probe messages stored thereon.

22. The method of claim 21 wherein said step of stalling said central arbitration circuit of the system control logic consists of stalling when one or more of the plurality of probe queues are in said second state.

23. The method of claim 21 wherein said probe queue is transitioned from said first state to said second state when a number of probe messages in said probe queue reaches a first threshold, wherein said probe message at said top of said probe queue is transitioned from the second state to said first state when said number falls below a second threshold.

24. The method of claim 23 wherein said first and said second threshold are equivalent.

25. A method for stalling probe queues in a multiprocessor computer system, each of said probe queues associated with one of a plurality of central processing units of a multiprocessor computer system, said method including the steps of:

A) maintaining in a first plurality of storage locations, coupled to one of said plurality of central processing units, a plurality of target addresses each associated with a read command issued by said one central processing unit;

B) updating said first plurality of storage locations by said one central processing unit to indicate when each of said read commands retrieves a copy of a data element associated with a corresponding one of said target addresses;

C) storing each of a plurality of probe messages, issued to said one central processing unit in said associated probe queue in an order corresponding to when said probe messages were issued to said one central processing unit;

D) stalling said associated probe queue when said one central processing unit determines that a least recently issued one of said probe messages targets a data element that is being retrieved by said one coupled central processing unit, as indicated by a corresponding one of said first plurality of storage locations.

26. The method of claim 25 wherein said step of stalling said associated probe queue further includes the step of refraining, by said one central processing unit, to process said least recently issued one of said probe messages until one of said first plurality of storage locations that corresponds to said data element targeted by said least recently issued one of said probe messages indicates that said data element targeted by said least recently issued one of said probe messages has been retrieved.

27. The method of claim 26 wherein each of said central processing units of said multiprocessor computer system is coupled to a system control logic, said system control logic issuing said probe messages to an appropriate one of said plurality of central processing units responsive to said read commands issued by said central processing units.

\* \* \* \* \*

UNITED STATES PATENT AND TRADEMARK OFFICE
CERTIFICATE OF CORRECTION

PATENT NO. : 6,085,294
DATED : July 4, 2000
INVENTOR(S) : Stephen Van Doren and Rahul Razdan It is certified that error appears in the above-identified patent and that said Letters Patent is hereby corrected as shown below:

In Claim 19, column 27, line 3, change "clement" to --element--.

In Claim 26, column 28, line 24, change "clement" to --element--.

Signed and Sealed this

Twenty-second Day of May, 2001

Attest:

NICHOLAS P. GODICI

Attesting Officer

Acting Director of the United States Patent and Trademark Office